(12) United States Patent
Bshara et al.

(10) Patent No.: US 10,191,864 B1
(45) Date of Patent: *Jan. 29, 2019

(54) STANDARDIZED INTERFACE FOR STORAGE USING AN INPUT/OUTPUT (I/O) ADAPTER DEVICE

(71) Applicant: Amazon Technologies, Inc., Seattle, WA (US)

(72) Inventors: Nafea Bshara, San Jose, CA (US); Georgy Machulsky, San Jose, CA (US); Anthony Nicholas Liguori, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/939,921

(22) Filed: Nov. 12, 2015

(51) Int. Cl.
| | |
|---|---|
| *G06F 3/00* | (2006.01) |
| *G06F 5/00* | (2006.01) |
| *G06F 13/12* | (2006.01) |
| *G06F 13/10* | (2006.01) |
| *G06F 9/455* | (2018.01) |
| *G06F 9/4401* | (2018.01) |
| *G06F 13/42* | (2006.01) |

(52) U.S. Cl.
CPC .......... *G06F 13/105* (2013.01); *G06F 9/4411* (2013.01); *G06F 9/4555* (2013.01); *G06F 13/4282* (2013.01)

(58) Field of Classification Search
CPC .... G06F 13/105; G06F 9/4411; G06F 9/4555; G06F 13/4282
USPC ..... 710/5, 812, 36, 62; 718/1; 257/E21.169; 711/162
See application file for complete search history.

(56) References Cited

U.S. PATENT DOCUMENTS

| | | | | |
|---|---|---|---|---|
| 7,381,639 | B2 * | 6/2008 | Chiang | C23C 14/046 257/E21.169 |
| 8,312,212 | B2 * | 11/2012 | Tolba | G06F 3/0607 711/112 |
| 2006/0031060 | A1 * | 2/2006 | Weissmann | G06F 9/45533 703/27 |
| 2007/0233775 | A1 * | 10/2007 | Jackson | G06F 9/545 709/201 |
| 2007/0288228 | A1 * | 12/2007 | Taillefer | G06F 9/45537 703/28 |

(Continued)

OTHER PUBLICATIONS

U.S. Appl. No. 14/939,912, filed Nov. 12, 2015, Titled: Standardized Interface for Network Using an Input/Output (I/O) Adapter Device.

(Continued)

*Primary Examiner* — Farley Abad
*Assistant Examiner* — Henry W Yu
(74) *Attorney, Agent, or Firm* — Kilpatrick Townsend & Stockton LLP

(57) ABSTRACT

An I/O (Input/Output) adapter device can present itself as a storage backend driver with an emulated storage backend driver interface to a corresponding storage frontend driver executing from an operating system running on a host device independent of a virtualization or non-virtualization environment. For each guest operating system executing from its respective virtual machine running on the host device, para-virtualized (PV) frontend drivers can communicate with corresponding PV backend drivers implemented by the I/O adapter device using a corresponding virtual function by utilizing SR-IOV (single root I/O virtualization) functionality.

21 Claims, 11 Drawing Sheets

(56) References Cited

U.S. PATENT DOCUMENTS

| | | | |
|---|---|---|---|
| 2007/0300241 A1* | 12/2007 | Prakash | G06F 9/45558 |
| | | | 719/321 |
| 2009/0089522 A1* | 4/2009 | Kulkarni | G06F 11/1464 |
| | | | 711/162 |
| 2009/0300660 A1 | 12/2009 | Solomon et al. | |
| 2011/0179414 A1* | 7/2011 | Goggin | G06F 3/061 |
| | | | 718/1 |
| 2011/0239213 A1 | 9/2011 | Aswani et al. | |
| 2012/0102491 A1 | 4/2012 | Maharana et al. | |
| 2012/0151483 A1 | 6/2012 | Belay et al. | |
| 2012/0284712 A1 | 11/2012 | Nimmagadda et al. | |
| 2013/0151908 A1 | 6/2013 | Iwanaga et al. | |
| 2014/0173600 A1* | 6/2014 | Ramakrishnan Nair | |
| | | | G06F 9/461 |
| | | | 718/1 |
| 2014/0229769 A1 | 8/2014 | Abraham et al. | |
| 2014/0372794 A1 | 12/2014 | Graham et al. | |
| 2015/0032910 A1* | 1/2015 | Ben Yehuda | G06F 13/4221 |
| | | | 710/15 |
| 2015/0058841 A1* | 2/2015 | Krempa | G06F 9/45558 |
| | | | 718/1 |

OTHER PUBLICATIONS

OASIS. Virtual I/O Device (VIRTIO) Version 1.0. [online] OASIS Open, Dec. 3, 2013 [retrieved on Nov. 13, 2015]. Retrieved from the Internet: <URL: http://docs.oasis-open.org/virtio/virtio/v1.0/csprd01/virtio-v1.0-csprd01.pdf>, 69 pages.

Jones, M. Tim. Virtio an I/O Virtualization framework for Linux. [online] IBM Developer Works, Jan. 29, 2010. [retrieved on May 8, 2017]. Retrieved from the Internet: <URL: https://www.ibm.com/developerworks/linux/library/I-virtio/index.html, 8 pages.

* cited by examiner

STANDARDIZED INTERFACE FOR STORAGE USING AN INPUT/OUTPUT (I/O) ADAPTER DEVICE

CROSS-REFERENCE TO RELATED APPLICATIONS

This application is related to and incorporates by reference for all purposes the full disclosure of co-pending U.S. patent application Ser. No. 14/939,912, filed Nov. 12, 2015, entitled "STANDARDIZED INTERFACE FOR NETWORK USING AN INPUT/OUTPUT (I/O) ADAPTER DEVICE" the contents of which are herein incorporated in its entirety.

BACKGROUND

Server computers often utilize device drivers to communicate with different devices. Generally, a device driver executes from an operating system running on a host device in the server computer. In most instances, the device driver is specific to the device. For example, in a non-virtualized environment, the operating system running on the server computer may execute a specific network device driver to communicate with a network interface card (NIC) from a particular vendor. Generally, the device driver may include proprietary or device specific code for different operating system vendors for each device type. In most operating systems the device drivers execute at the same privilege level as the kernel of the operating system or at least at a very high privilege level within the operating system. Therefore, the stability of the operating system is dependent on the stability and maturity of the device drivers running as part of the operating system.

As new devices are introduced in the market place, supporting the vast number of device drivers in the operating systems becomes a challenging task, adversely affecting the ability for device vendors to rapidly introduce products. The vendor for the device driver faces the challenge of developing and providing a stable device driver for each operating system vendor and influencing their ecosystem to include the vendor's device driver. For example, the device drivers executing from the Linux® operating system or the Windows® operating system for communicating with the same NIC may be different. This problem is further exacerbated in a virtualized environment, where multiple operating systems may execute on the same server system and interact with multiple I/O devices.

BRIEF DESCRIPTION OF THE DRAWINGS

Various embodiments in accordance with the present disclosure will be described with reference to the drawings, in which.

DETAILED DESCRIPTION

Figure 1:
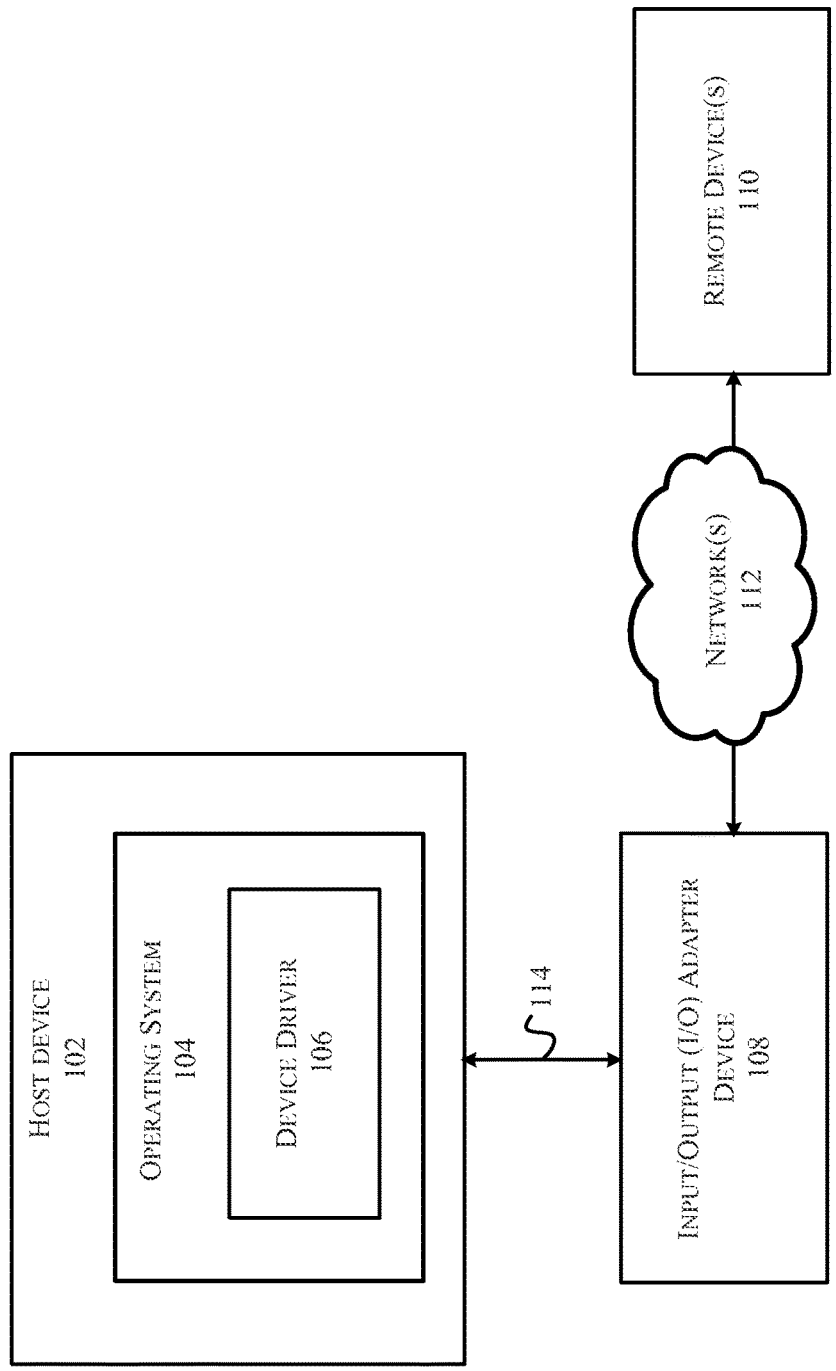
FIG. 1 illustrates a system comprising a host device executing a device specific driver for communicating with an input/output (I/O) adapter device in a non-virtualized environment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A device driver or a driver may include software code for communicating with a device coupled to a computer. For example, a device driver may provide an interface for communication between an operating system running on the computer and the device hardware. Operating system may include software code that can manage hardware and software resources for the computer. The operating system can provide a software platform for running various application programs on top of the operating system. Server computers may often utilize device drivers with proprietary or device specific code to communicate with a specific device in a non-virtualized environment. Hence, different device drivers may be needed for different operating systems executing on the server computers to communicate with the same device. Further, for different devices, different device drivers may be needed for each type of operating system. This may create a challenge for both the operating system vendors and the device driver vendors to provide a stable and mature interface between the device drivers and the device for different device types.

Furthermore, this problem is further exacerbated in a virtualized environment, where multiple operating systems may execute on the same server system and interact with multiple I/O devices. Virtualization allows emulation of a single device or platform to be used as multiple virtual devices or virtual platforms. In some instances, virtualization can allow multiple virtual machines to run on the same hardware device in their respective guest operating systems. A hypervisor or a virtual machine manager (VMM) can emulate a single device as multiple virtual devices in a virtualized environment. Para-virtualization can simplify operations of the hypervisor and the virtual machines. In para-virtualization, operating systems can be modified to run on the host device so that the operating systems are aware of running in a virtualized environment. For example, source code of an operating system can be modified to run as a guest operating system inside a specific virtual machine on the host device. The guest operating systems can include drivers that can act as front end, called PV frontend drivers. In some instances, a driver domain can implement PV backend drivers for specific device emulation. For example, the driver domain can provide a separate domain to run and manage hardware drivers that has access to real devices. In some instances, the driver domain and the hypervisor functionality can exist in the same environment, e.g., KVM, ESXi, etc. In some instances, the driver domain and the hypervisor operate in different environments, e.g., Xen. Para-virtualization allows communication between the guest operating systems and the driver domain that can result in improved performance since the guest operating systems can run in cooperation with the driver domain, e.g., via PV frontend and PV backend drivers. VirtIO implementation can allow the guest operating systems to execute standard PV drivers to communicate with backend drivers that are implemented in the driver domain. Each driver domain can implement specific device emulation behind the PV backend drivers. Therefore, the driver domain has to implement device specific drivers to communicate with each device. Hence, this solution may require the driver domain to include the support for vendor specific drivers for each device type.

Various embodiments of the disclosed technologies can allow an input/output (I/O) adapter device to implement the functionality of one or more backend drivers to communicate with one or more frontend drivers executing on a host device using corresponding emulated backend driver interfaces. For example, in some embodiments, an emulated backend driver interface can include an interface emulated by the I/O adapter device (e.g., an Application Programming Interface) to be compatible or compliant with a backend driver, which is typically implemented in a driver domain or a hypervisor. In different embodiments, the I/O adapter device can include an emulated backend driver interface to present itself as a backend driver to communicate with a frontend driver running on the host device. The emulated backend driver interface can be independent of the implementation of the backend driver functionality by the I/O adapter device. The one or more backend drivers implemented by the I/O adapter device can communicate with the corresponding one or more frontend drivers through a host interface using one or more communication channels between the one or more backend drivers and the one or more frontend drivers. For example, the communication channel may be based on a PCI/PCIe space mapped to a memory address or I/O port address space of the host device. In some instances, the I/O adapter device may include a storage device interface to communicate with a storage device coupled to the I/O adapter device and a network interface to communicate with a remote device via a network. Some embodiments of the disclosed technologies can allow the I/O adapter device to communicate with a storage frontend driver executing on the host device using an emulated storage backend driver interface and to communicate with a network frontend driver executing on the host device using an emulated network backend driver interface. For example, the I/O adapter device can be interface compatible with a storage backend driver using the emulated storage backend driver interface and interface compatible with a network backend driver using the emulated network backend driver interface. Embodiments of the disclosed technologies can be performed in non-virtualized or virtualized environments. In one embodiment, one or more frontend drivers executing from an operating system running on a host device can communicate with one or more backend drivers implemented by the I/O adapter device using a host interface, e.g., Peripheral Component Interconnect Express (PCIe) or PCI interface, in a non-virtualized environment. In another embodiment, one or more frontend drivers executing from one or more guest operating systems running in one or more virtual machines on the host device can communicate with one or more backend drivers implemented by the I/O adapter device. In some embodiments of the technology, the I/O adapter device can emulate the functionality of para-virtualization (PV) backend drivers that are Virtualization Input/Output (VirtIO) compliant. Each PV backend driver implemented by the I/O adapter device can communicate with a corresponding PV frontend driver executing from a guest operating system using a corresponding emulated PV backend driver interface. For example, a guest operating system running on the host device may be aware of the virtualized environment and can utilize a standard or generic PV frontend driver to communicate with a specific device type, e.g., a NIC. The I/O adapter device can support the standardized or uniform I/O interface to communicate with the PV frontend drivers by emulating the backend driver interfaces.

According to some embodiments, one or more PV backend drivers implemented by the I/O adapter device can communicate directly with the corresponding PV frontend drivers on the host device using a PCIe interface and without interfacing with a hypervisor or a driver domain on the host device.

In some embodiments, the I/O adapter device can be a single root input/output virtualization (SR-IOV) compliant device. The SR-IOV generally refers to a standard specification that can allow a single PCIe physical device to appear as multiple, independent physical devices to the hypervisor or to the guest operating systems. SR-IOV typically requires support in the BIOS, as well as support in the hypervisor or the guest operating system running on the host device. SR-IOV-enabled PCIe devices can present multiple instances of themselves to the guest operating systems and the hypervisor. SR-IOV takes advantage of the physical functions (PFs) and the virtual functions (VFs). The physical function can be a PCI Express (PCIe) function of the I/O adapter device that can support the SR-IOV interface. The virtual function can be associated with a PCIe physical function on the I/O adapter device, and can represent a virtualized instance of the I/O adapter device. Each virtual function can have its own PCI configuration space. According to some embodiments, the SRIOV functionality can allow the I/O adapter device to implement multiple virtual functions wherein each virtual function can emulate functionality of a corresponding PV backend driver. The PV backend drivers implemented by the I/O adapter device can communicate with the PV frontend drivers through the host interface using a logical communication channel between the backend drivers and the frontend drivers based on one or more corresponding virtual functions.

Various embodiments of the disclosed technologies can allow an I/O adapter device to implement the functionality of a backend driver to communicate with a frontend driver executing from an operating system running on the host device independent of the virtualization or non-virtualization environment. Thus, different embodiments can allow moving the backend driver functionality, typically implemented in the software in a driver domain or a hypervisor, to the I/O adapter device with a compatible backend driver interface. This can accelerate adoption of newer devices, since no introduction of changes in the operating system, drivers running in the operating system and/or the driver domain in a virtualized environment are needed. By implementing the backend driver functionality in the I/O adapter device, new I/O adapter devices can be rapidly introduced in the market, as long as the I/O adapter device conforms to the interface expected by the frontend driver. Furthermore, new versions of the I/O adapter device can be introduced in the market place by maintaining the interface in the backend driver and making the changes internal to the I/O adapter device.

Further, bypassing the hypervisor or the driver domain can provide improved performance in terms of latency and bandwidth for transfer of data between the host device and the I/O adapter device since the hypervisor or the driver domain is not involved in the data path.

FIG. 1 illustrates a typical system comprising a host device executing a device specific driver for communicating with an input/output (I/O) adapter device in a non-virtualized environment.

As illustrated in FIG. 1, a system 100 may include a host device 102 in communication with an I/O adapter device 108 via a host interface 114. The host interface 114 may include any standard interface, e.g., PCI or PCIe interface. The I/O adapter device 108 may be configured to communicate with one or more remote devices 110 via one or more networks 112. An operating system 104 may be configured to execute a device driver 106 on the host device 102 for communicating with the I/O adapter device 108.

The host device 102 may include one or more processors that may be configured to execute a plurality of instructions that may be stored in a computer readable storage medium. The computer-readable storage medium may be non-transitory. In some instances, the computer readable medium may be part of a host memory, e.g., RAM, ROM, Electrically Erasable Programmable Read-Only Memory (EEPROM), flash memory or any suitable storage media. The host memory may be internal or external to the host device 102. In some instances, the host device 102 may include an x86 CPU platform, e.g., Xeon, Pentium, Atom, Athlon, etc. for running the operating system 104. For example, the operating system 104 may be Linux® operating system, Windows® operating system, FreeBSD operating system, Solaris operating system, or any suitable operating system.

In some instances, the I/O adapter device 108 may be configured to perform network services for the host device 102, e.g., network traffic monitoring, network storage, network processing, etc. Some non-limiting examples of the I/O adapter device 108 may include plug-in modules, expansion cards or any such electronic circuits, e.g., network interface controllers, video cards, sound cards, USB (Universal Serial Bus) devices, Wi-Fi devices, etc. In some instances, the host device 102 may send data via the I/O adapter device 108 to the remote devices 110 for further processing. For example, the remote devices 110 may include server computers that can provide services to different clients such as cloud computing, cloud storage, data processing and warehousing, archive, analytics, web services, databases, applications, deployment services, website hosting, etc. In some instances, the networks 112 may include one or more networks that may be based on different protocols such as the Internet Protocol (IP), Ethernet, Wi-Fi, Transmission Control Protocol (TCP), User Datagram Protocol (UDP), Asynchronous Transfer Mode (ATM), token ring, frame relay, High Level Data Link Control (HDLC), Fiber Distributed Data Interface (FDDI), Point-to-Point Protocol (PPP), etc.

Typically, in a non-virtualized environment, each device driver running on the host device 102 may include specific or proprietary code for different operating systems to communicate with an I/O device coupled to the host device 102. For example, if the I/O adapter device 108 is a network interface card, the device driver 106 may include specific code for a network device driver from a particular operating system vendor to communicate with the I/O adapter device 108 from a particular vendor. Hence, in typical systems, different device drivers may be needed for different operating systems running on the host device 102 for different devices. For example, for Linux® operating system running on the host device 102, a Linux® NIC driver may be needed to communicate with the I/O adapter device 108, for Windows® operating system running on the host device 102, a Windows® NIC driver may be needed to communicate with the I/O adapter device 108, and so on. Similarly, if the I/O adapter device 108 is an audio card, different audio drivers may be needed for Linux® operating system, Windows® operating system, etc., that can be executing on the host device 102. A possible solution to overcome this problem can utilize a standard driver for each device type and also a well-defined hardware interface for the device. For example, the device driver vendors can comply with the standard interface for the device drivers maintained by the operating system vendors. This solution can provide fully controlled environment from the maintenance perspective. However, the standard device drivers may not be able to support the older versions of the operating systems.

In some instances, running an operating system in a virtualized environment can provide the option of having a standard driver for each guest operating system executing inside a virtual machine running on the host device, e.g., using virtIO. VirtIO can provide a virtualization standard where the device driver for the guest operating system knows it is running in a virtual environment, and cooperates with the driver domain. This can provide most of the performance benefits of para-virtualization. Hence, PV drivers utilizing virtIO can overcome the problem of having device specific drivers for each operating system, as discussed with reference to FIG. 2.

Figure 2:
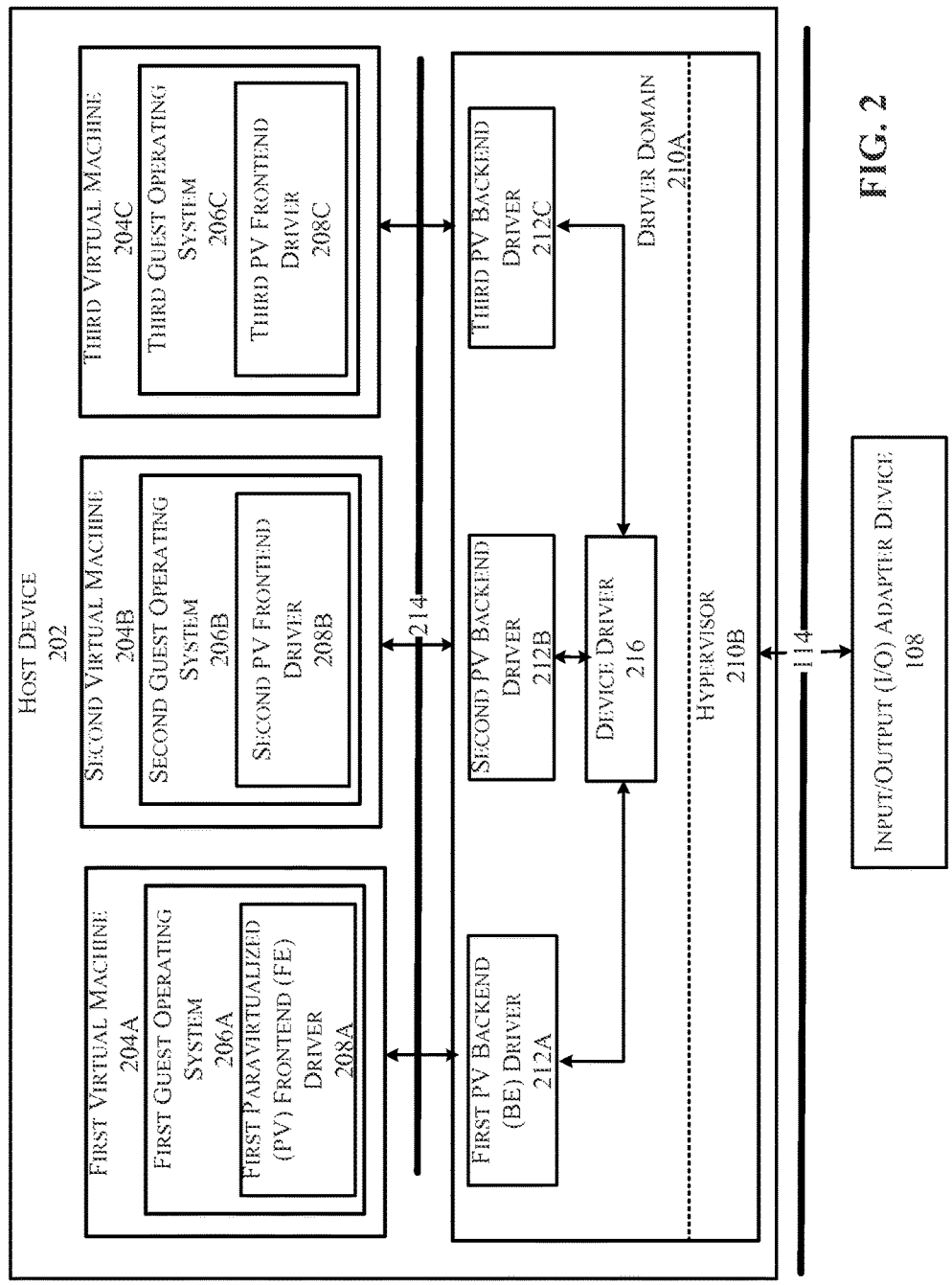
FIG. 2 illustrates a system with para-virtualization (PV) frontend drivers executing from guest operating systems on a host device in communication with corresponding PV backend drivers executing from a driver domain on the host device.

FIG. 2 illustrates a typical system with PV frontend drivers executing from guest operating systems on a host device in communication with corresponding PV backend drivers executing from a hypervisor/driver domain on the host device. A system 200 includes a host device 202 in communication with the I/O adapter device 108 via the host interface 114. The I/O adapter device 108 can be configured to communicate with the remote devices 110 via the networks 112 as discussed with reference to FIG. 1.

The system 200 utilizes virtualization to allow multiple virtual machines to run on the same physical platform on the host device 202 in their respective operating systems. Para-virtualization can allow modifying the operating systems to run on the host device 202 so that the operating systems are aware of running in a virtualized environment. For example, source code of an operating system can be modified to run as a guest operating system inside a specific virtual machine on the host device. A driver domain 210A can be responsible for running the PV backend drivers and managing the physical device, the I/O adapter device 108. In one embodiment, functionality of the driver domain 210A may be integrated with a hypervisor 210B, e.g., Xen. In another embodiment, the driver domain 210A and the hypervisor 210B may be independent entities, e.g., KVM, ESX/ESXi. The hypervisor 210B or a virtual machine manager (VMM) can emulate a single device as multiple virtual devices in a virtualized environment. The virtual machines may be any suitable emulation of a computer system that may be managed by the hypervisor 210B. The hypervisor 210B can also manage the flow of information between software, the virtualized hardware, and the physical hardware. The guest operating systems can include drivers that can act as front end, called PV frontend drivers. The driver domain 210A can implement PV backend drivers for specific device emulation.

As illustrated in the figure, in some instances, a first PV frontend driver 208A can execute from a first guest operating system 206A running in a first virtual machine 204A, a second PV frontend driver 208B can execute from a second guest operating system 206B running in a second virtual machine 204B, and a third PV frontend driver 208C can execute from a third guest operating system 206C running in a third virtual machine 204C on the host device 202. For example, the first guest operating system 206A may be freeBSD® operating system, the second guest operating system 206B may be Windows® operating system and the third guest operating system 206C may be Linux® operating system.

The hypervisor 210B may be configured to manage one or more virtual machines on the host device, for example, to create, start, monitor, stop or to delete the first virtual machine 204A, second virtual machine 204B and the third virtual machine 204C. In some implementations, the hypervisor 210B can manage access controls, resources, scheduling, isolation, etc. for the virtual machines 204A-204C executing the guest operating systems 206A-206C. The driver domain 210A can implement one or more PV backend drivers for specific device emulation, e.g., a first PV backend driver 212A, a second PV backend driver 212B and a third PV backend driver 212C. The driver domain 210A may also include a device driver 216 for communicating with the I/O adapter device 108. The device driver 216 may be specific to the I/O adapter device 108. In some instances, the device driver 216 may utilize a different protocol to communicate with the I/O adapter device 108 than the communication protocol used by the PV frontend and backend drivers.

Para-virtualization can allow communication between the guest operating systems 206A-206C and the driver domain 210A that can result in improved performance since the guest operating systems 206A-206C can run in cooperation with the driver domain 210A, e.g., via the PV frontend drivers 208A-208C and the PV backend drivers 212A-212C. In some instances, the first PV frontend driver 208A may communicate with the first PV backend driver 212A in the driver domain 210A, the second PV frontend driver 208B may communicate with the second PV backend driver 212B in the driver domain 210A, and the third PV frontend driver 208C may communicate with the third PV backend driver 212C in the driver domain 210A using the virtual bus 214. The virtual bus 214 may be a virtual PCI bus or a proprietary software bus.

In some instances, the PV frontend drivers 208A-208C and the PV backend drivers 212A-21C can be virtIO compliant. VirtIO can improve compatibility between driver domains when using PV drivers. For example, a virtIO compatible PV frontend driver installed in a guest operating system can interact with any driver domain implementing a virtIO backend driver. VirtIO can provide a standardized interface implemented in the guest operating system that can enable the use of standard PV frontend drivers to work with various driver domains implementing the PV backend drivers. For example, each of the PV frontend drivers 208A-208C can be generic or standard driver for the respective guest operating system 206A-206C, that is independent of the type or vendor of the I/O adapter device 108. Thus, in the PV environment utilizing virtIO, a guest operating system can be configured to communicate with a standard device type using standard frontend drivers. However, the driver domain 210A has to implement device specific drivers to communicate with each device type. For example, depending on the functionality of the I/O adapter device 108 as a NIC, video card, sound card or any other I/O device, the driver domain 210A has to implement different drivers to communicate with the respective device type. In some implementations, different driver domains may exist for different types of devices. For example, a network domain may include a domain for network drivers to provide access to network devices, and a block device domain may include a domain for block device drivers to provide access to block devices. Hence, this solution may require the driver domain 210A to include the support for vendor specific drivers for each device type. In addition, PV frontend drivers 208A-208C may be specific to the driver domain 210A. Hence, for different driver domains, different PV frontend drivers may need to be installed for each guest operating system. This can result in complex driver architecture and may also require cooperation among the operating system vendors, driver domain vendor and the device vendors.

Figure 3A:
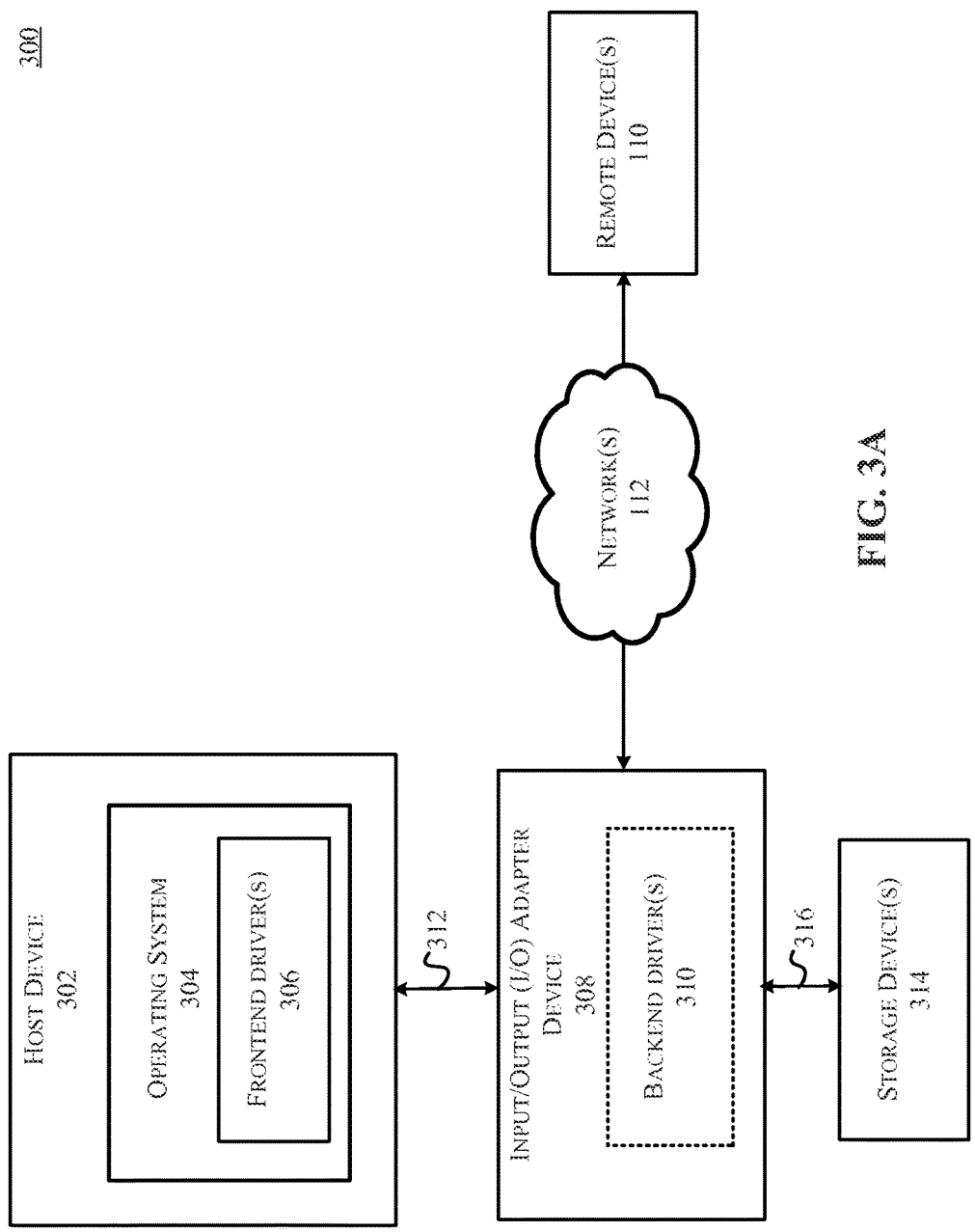
FIG. 3A illustrates a host device executing a frontend driver running from an operating system on a host device in communication with a backend driver implemented by an I/O adapter device, according to one embodiment of the disclosed technology.

FIG. 3A illustrates a system comprising a host device executing a frontend driver running from an operating system on the host device in communication with a backend driver emulated by an I/O adapter device, according to one embodiment of the disclosed technology.

As illustrated in the figure, a system comprises a host device 302 in communication with an I/O adapter device 308 via a host interface 312. An operating system 304 executing on the host device 302 may be configured to execute one or more frontend drivers 306. The I/O adapter device 308 may be configured to implement the functionality of one or more backend drivers 310. Note that in FIG. 3A, the I/O adapter device 308 is shown to include the one or more backend drivers 310 for illustration purposes only. It will be understood that the I/O adapter device 308 can implement the functionality of the one or more backend drivers 310 or can present itself as the one or more backend drivers 310 using corresponding emulated backend driver interfaces to communicate with the one or more frontend drivers 306 via the host interface 312. The I/O adapter device 308 may be configured to communicate with the one or more remote devices 110 via the networks 112 as discussed with reference to FIG. 1.

The I/O adapter device 308 may also be communicatively coupled to one or more storage devices 314 via a storage device interface 316. For example, the one or more storage devices 314 may include local storage devices, e.g., SSDs (Solid State Drives), compact discs, USB portable drives, SATA (Serial Advanced Technology Attachment) drives, etc.

The storage device interface 316 may include any suitable interface, e.g., SATA interface, PCI/PCIe interface, Serial Attached SCSI (SAS), etc.

According to some embodiments of the disclosed technologies, the one or more backend drivers 310 implemented by the I/O adapter device 308 may be configured to communicate with the one or more frontend drivers 306 executing on the host device 302 via the host interface 312 using a corresponding emulated backend driver interface. For example, the one or more backend drivers 310 may include a storage backend driver and/or a network backend driver. It will be understood that the backend drivers 310 can also include drivers for other types of devices, e.g., audio cards, video cards, etc., which are not shown here for the purposes of simplicity. For example, the I/O adapter device 308 may be capable of providing interface compatible backend drivers by implementing the functionality of different types of backend drivers with emulated backend driver interfaces. The storage backend driver may be configured to communicate with the storage device 314 and the network backend driver may be configured to communicate with the remote devices 110 via the networks 112. The storage backend driver and the network backend driver may communicate with a corresponding storage frontend driver and a network frontend driver executing on the host device 302 through the host interface 312 using one or more communication channels, as discussed with reference to FIG. 3B. The host interface 312 may include a standard interface, e.g., a PCI or PCIe interface and the communication channel may be based on a PCI/PCIe exposed memory space. In one embodiment, the I/O adapter device 308 may be mapped as a PCI/PCIe device by implementing a PCI/PCIe configuration and memory space. For example, the PCI/PCIe configuration space can include a set of registers that may be mapped to memory locations. The I/O adapter device 308 may be mapped into the host device's I/O port address space or memory-mapped address space. This can allow the operating system 304 to have direct access to the emulated backend drivers 310 by accessing the PCI/PCIe configuration space of the I/O adapter device 308, e.g., using APIs (Application Programming Interfaces).

In one embodiment, the operating system 304 may be executing on the host device 304 in a non-virtualized environment. Some embodiments of the disclosed technology can utilize virtIO standard to enable the use of a standard driver executing from the operating system 304 for supporting most or all devices. VirtIO standard specification can be found at "http://docs.oasis-open.org/virtio/virtio/v1.0/csprd01/virtio-v1.0-csprd01.pdf" for further details. For example, the frontend driver 306 executing from the operating system 304 may be a standard driver for the operating system 304. The frontend driver 306 may include a standard interface to communicate with the backend driver 310. In one embodiment, the frontend driver 306 and the backend driver 310 may include a standard interface to communicate via the host interface 312, e.g., PCI or PCIe interface. For example, the I/O adapter device 308 can be mapped in the PCIe memory exposed space of the host device 302 to allow the frontend driver 306 to have direct access to the backend driver 310 via the PCIe interface using an emulated backend driver interface. The I/O adapter device 308 can implement the functionality of the backend driver 310 using any mechanism. In different embodiments, the I/O adapter device 308 can communicate with the frontend driver 306 using the emulated backend driver interface independent of the implementation of the backend driver 310 by the I/O adapter device 308. This may allow the I/O adapter device 308 to work with any operating system running on the host device 302 independent of the operating system version. In one embodiment, the device specific functionalities may be inherent to the I/O adapter device 308. Thus, the backend driver 310 may not need to include or communicate with a device specific driver, e.g., the device driver 216 as discussed with reference to FIG. 2.

Figure 3B:
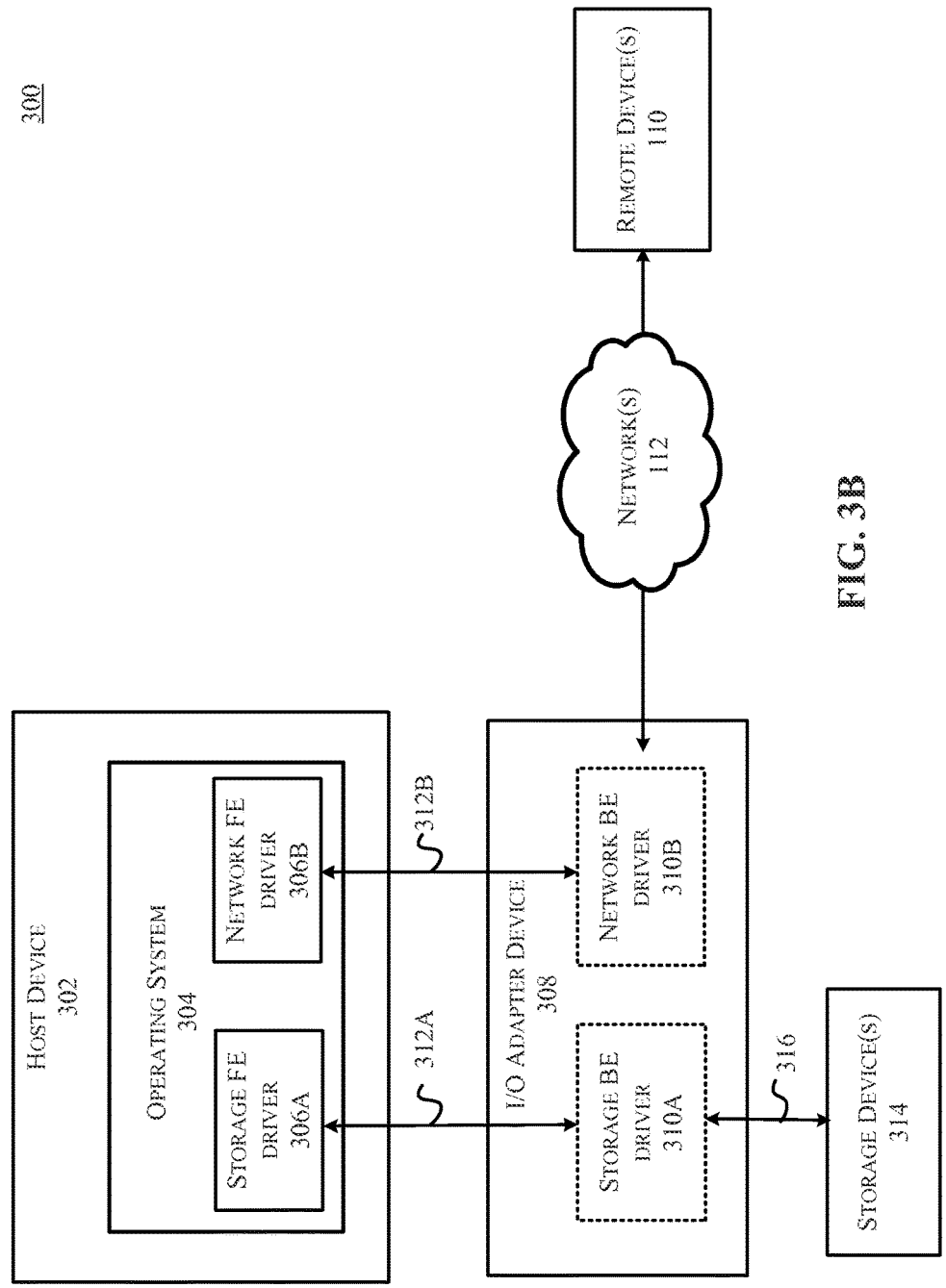
FIG. 3B illustrates frontend (FE) and backend (BE) drivers for storage and network devices communicatively coupled to the I/O adapter device, according to one embodiment of the disclosed technology.

FIG. 3B illustrates frontend (FE) and backend (BE) drivers for storage and network devices communicatively coupled to the I/O adapter device 308, according to one embodiment of the disclosed technology.

As illustrated in the figure, a storage frontend driver 306A executing from the operating system 304 may communicate with a storage backend driver 310A implemented by the I/O adapter device 308 via a host interface 312A, and a network frontend driver 306B executing from the operating system 304 may communicate with a network backend driver 310B implemented by the I/O adapter device 308 via a host interface 312B. Note that in FIG. 3B, the I/O adapter device 308 is shown to include the storage BE driver 310A and the network BE driver 310B for illustration purposes only. It will be understood that the I/O adapter device 308 can implement the functionality of the storage BE driver 310A and the network BE driver 310B or can present itself as the storage BE driver 310A and the network BE driver 310B using corresponding emulated backend driver interfaces to communicate with the storage FE driver 306A and the network FE driver 306B via the host interface 312A and 312B respectively. The host interfaces 312A and 312B may be similar to the host interface 312, as discussed with reference to FIG. 3A. In some embodiments, the host interfaces 312A and 312B may be based on a PCI/PCIe protocol that can allow the host device 302 to have direct access to the backend drivers via the PCIe interface. For example, the operating system 304 can access the storage backend driver 310A and the network backend driver 310B by accessing the PCI/PCIe configuration space of the I/O adapter device 308. The storage backend driver 310A can communicate with the storage devices 314 via the storage device interface 316, as discussed with reference to FIG. 3A. The network backend driver 310B can communicate with the remote devices 110 via the networks 112. It will be understood that in some implementations the I/O adapter device 308 can also implement the functionality of a video backend driver or an audio backend driver to communicate with a corresponding video frontend driver or an audio frontend driver executing from the operating system 304, without deviating from the scope of the disclosed technologies.

As discussed with reference to FIGS. 3A and 3B, some embodiments of the disclosed technologies can allow the I/O adapter device 308 to communicate with the frontend drivers 306 executing on the host device 302 using emulated backend driver interfaces by presenting itself as the backend drivers 310. VirtIO implementation can allow the use of standard frontend drivers 306 for a particular operating system that can overcome the challenges faced using the device specific drivers, as discussed with reference to FIG. 1. In one embodiment, the frontend driver 306 can be PV drivers and the I/O adapter device 308 can emulate the functionality of PV backend drivers by utilizing Single Root I/O Virtualization (SR-IOV) implementation, as discussed with reference to FIG. 4.

Figure 4:
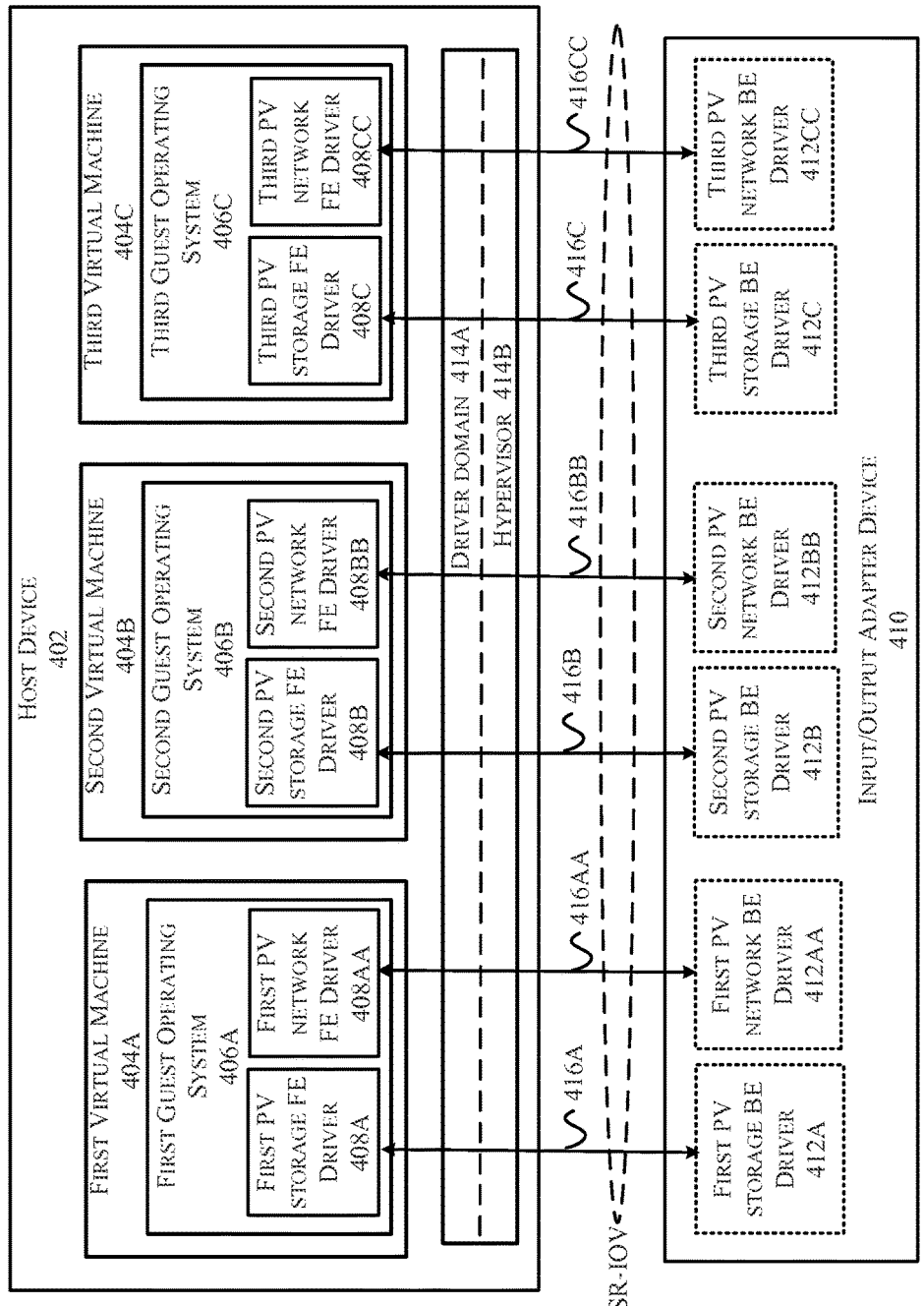
FIG. 4 illustrates a system comprising a host device configured to communicate with an I/O adapter device utilizing SR-IOV and Virtualization Input/Output (VirtIO) implementation, according to some embodiments of the disclosed technology.

FIG. 4 illustrates a system comprising a host device configured to communicate with an I/O adapter device utilizing SR-IOV and virtIO implementation, according to some embodiments of the disclosed technology.

Some embodiments of the disclosed technology can be performed in virtualized environment. Virtualization can allow multiple virtual machines to run on the same host device in their respective guest operating systems. The guest operating systems can run in a virtual machine with or without modification. The one or more virtual machines can be configured to emulate any computer system. The one or more virtual machines may typically communicate with the host device hardware via a driver domain, hypervisor or a VMM. Para-virtualization can simplify operations of the hypervisor and the virtual machines. In para-virtualization, operating systems can be modified to run on the host device so that the operating systems are aware of running in a virtualized environment. Further, virtIO implementation can allow the use of one or more standard or generic PV frontend drivers executing from their respective guest operating systems on the host device. Embodiments of the disclosed technologies can also support other standard PV drivers for different types of devices, for example, network drivers (e.g., XEN netdev, etc.) for network devices and block storage drivers (e.g., XEN blkdev, XEN scsidev, etc.) for block storage devices. Some embodiments of the technology can utilize SR-IOV implementation, which can allow an I/O adapter device to appear as multiple physical devices implementing multiple virtual functions. Each virtual function can emulate functionality of a PV backend driver configured to communicate with its corresponding PV frontend driver from a plurality of PV frontend drivers running on the host device. For example, different virtual functions can emulate functionality of different PV backend drivers for storage devices, network devices, audio, devices video devices, etc. The I/O adapter device 410 can include emulated PV backend driver interfaces which can be interface compatible with the PV backend drivers, e.g., the PV backend drivers 212A-212C, as discussed with reference to FIG. 2. Each guest operating system running from a virtual machine on the host device may execute a plurality of PV frontend drivers, e.g., a storage PV frontend driver, a network PV frontend driver, etc. According to some embodiments of the disclosed technologies, each of the plurality of PV frontend drivers executing from a guest operating system on the host device may communicate with a corresponding PV backend driver (e.g., a storage PV backend driver, a network PV backend driver, etc.) based on the corresponding virtual function implemented in the I/O adapter device via its respective virtual host interface. In some embodiments, the storage PV backend driver may communicate with a storage device coupled to the I/O adapter device via a storage device interface and the network PV backend driver may communicate with a remote device communicatively coupled to the I/O adapter device via a network.

As illustrated in FIG. 4, a host device 402 may be configured to communicate with an I/O adapter device 410 in a para-virtualized environment. For example, multiple instances of virtual machines, e.g., a first virtual machine 404A, a second virtual machine 404B and a third virtual machine 404C may be running its respective guest operating systems, e.g., a first guest operating system 406A, a second guest operating system 406B and a third guest operating system 406C on the host device 402. In some embodiments, the each guest operating system running on the host device 402 from its respective virtual machine may be aware of the virtualized environment and can utilize one or more standard or generic PV frontend drivers to communicate with corresponding one or more PV backend drivers implemented by the I/O adapter device 410. Hence, embodiments of the disclosed technology can allow communication between the one or more PV frontend drivers executing on the host device 402 and the one or more PV backend drivers implemented by the I/O adapter device 410 irrespective of the operation system version. In one embodiment, a first PV network frontend driver 408A and a first PV storage frontend driver 408AA may be executing from the first guest operating system 406A on the host device 402, a second PV network frontend driver 408B and a second PV storage frontend driver 408BB may be executing from the second guest operating system 406B on the host device 402, and a third PV frontend driver 408C and a third PV storage frontend driver 408CC may be executing from the third guest operating system 406C on the host device 402. For example, the first guest operating system 406A may be freeBSD® operating system, the second guest operating system 406B may be Windows® operating system and the third guest operating system 406C may be Linux® operating system.

SR-IOV implementation can allow the I/O adapter device 410 to implement multiple virtual functions for emulating the functionality of respective PV backend drivers, e.g., a first PV network backend driver 412A, a first PV storage backend driver 412AA, a second PV network backend driver 412B, a second PV storage backend driver 412BB, a third PV network backend driver 412C and a third PV storage backend driver 412CC. The first PV network backend driver 412A may be configured to communicate with the first PV network frontend driver 408A executing from the first guest operating system 406A via a virtual host interface 416A, the first PV storage backend driver 412AA may be configured to communicate with the first PV storage frontend driver 408AA executing from the first guest operating system 406A via a virtual host interface 416AA, the second PV network backend driver 412B may be configured to communicate with the second PV network frontend driver 408B executing from the second guest operating system 406B via a virtual host interface 416B, the second PV storage backend driver 412BB may be configured to communicate with the second PV storage frontend driver 408BB executing from the second guest operating system 406B via a virtual host interface 416BB, the third PV network backend driver 412C may be configured to communicate with the third PV network frontend driver 408C executing from the third guest operating system 406C via a virtual host interface 416C, and the third PV storage backend driver 412CC may be configured to communicate with the third PV storage frontend driver 408CC executing from the third guest operating system 406C via a virtual host interface 416CC. Note that in FIG. 4, the I/O adapter device 410 is shown to include the storage BE drivers 412A-412C and the network BE drivers 412AA-412CC for illustration purposes only. It will be understood that the I/O adapter device 410 can implement the functionality of the storage BE drivers 412A-412C and the network BE drivers 412AA-412CC or can present itself as the storage BE drivers 412A-412C and the network BE drivers 412AA-412CC using corresponding emulated storage backend driver interfaces and emulated network backend driver interfaces to communicate with the storage FE drivers 408A-408C and the network FE drivers 408AA-408CC respectively.

SR-IOV takes advantage of the physical functions and the virtual functions. The physical function can be a PCI Express (PCIe) function of the I/O adapter device 410 that can support the SR-IOV interface. The physical function can include the SR-IOV extended capability in the PCIe configuration space. The capability can be used to configure and manage the SR-IOV functionality of the I/O adapter device 410, such as enabling virtualization and exposing the virtual functions. The virtual function can be associated with a PCIe physical function on the I/O adapter device 410, and can represent a virtualized instance of the I/O adapter device 410. According to some embodiments, each virtualized instance of the I/O adapter device can be interface compatible with a PV backend driver typically implemented in a driver domain or a hypervisor. For example, a first virtualized instance of the I/O adapter device comprising a first PV backend driver interface can be interface compatible with the first PV backend driver 212A, a second virtualized instance of the I/O adapter device comprising a second PV backend driver interface can be interface compatible with the second PV backend driver 212B, a third virtualized instance of the I/O adapter device comprising a third PV backend driver interface can be interface compatible with the third PV backend driver 212C, etc. Each virtual function can have its own PCI configuration space. For each guest operating system, a PV frontend driver can communicate with the corresponding PV backend driver implemented by the I/O adapter device 410 based on the virtual function assigned to it. Each virtual function can also share one or more physical resources on the I/O adapter device 410, such as an external network port, a storage device interface, etc., with the physical functions and other virtual functions. A virtual function can be exposed as a virtual I/O adapter device emulating the respective PV backend driver to the guest operating system that runs in a virtual machine on the host device.

Some embodiments of the disclosed technologies can allow the I/O adapter device 410 to utilize SR-IOV implementation to enable the communication between the PV network backend drivers 412A-412C implemented by the I/O adapter device 410 and the PV network frontend drivers 408A-408C running on the host device 402 using a logical communication channel through its respective virtual host interface 416A-416C. Similarly, communication between the PV storage backend drivers 412AA-412CC and the PV storage frontend drivers 408AA-408CC can use a logical communication channel through its respective virtual host interface 416AA-416CC. For example, the logical communication channel may be based on a corresponding virtual function which can expose the PV network backend drivers 412A-412C implemented by the I/O adapter device 410 to the PV network frontend drivers 408A-408C and the PV storage backend drivers 412AA-412CC implemented by the I/O adapter device 410 to the PV storage frontend drivers 408AA-408CC executing on the host device 402 through its corresponding PCI/PCIe configuration and memory mapped space. Each virtual function can be exposed as a virtual I/O adapter device in each guest operating system 406A-406C that is executing in the respective virtual machine 404A-404C running on the host device 402. For example, the PV network backend drivers 412A-412C and the PV storage backend drivers 412AA-412CC can be addressed as PCI/PCIe devices by mapping each of the PV network backend drivers 412A-412C and the PV storage backend drivers 412AA-412CC to an I/O port address space or memory mapped address space of the host device 402. In some embodiments, the I/O adapter device 410 can implement device specific functionalities associated with each virtual I/O adapter device exposed by the corresponding virtual function. In one embodiment, the first PV storage frontend driver 408A can communicate through the virtual bus interface 416A with the first PV storage backend driver 412A emulated by a first virtual function, the second PV storage frontend driver 408B can communicate through the virtual bus interface 416B with the second PV storage backend driver 412B emulated by a second virtual function and the third PV storage frontend driver 408C can communicate through the virtual bus interface 416C with the third PV storage backend driver 412C emulated by a third virtual function. Similarly, the first, second and third PV network frontend drivers can communicate through their respective virtual bus interfaces with the corresponding PV network backend drivers emulated by their corresponding virtual functions.

According to different embodiments of the disclosed technologies, the I/O adapter device 410 can implement the functionalities of the PV storage backend drivers and the PV network backend drivers, thus allowing to bypass a driver domain 414A or a hypervisor 414B in the host device 402 which is typically used as a domain to execute backend drivers. The hypervisor 414B may be configured to manage the one or more guest operating systems each executing in the corresponding virtual machine. In some embodiments, the hypervisor 414B can manage access controls, resources, scheduling, isolation, etc. for the virtual machines 404A-404C running the guest operating systems 406A-406C. For example, the hypervisor 414B can manage host device resources, e.g., memory, processors, etc. for allocating to each guest operating system. The hypervisor 414B may also manage access controls for each virtual machine for performing certain restricted functions since in some instances the virtual machines 404A-404C running in the respective guest operating systems 406A-406C may have lower access privileges. The hypervisor 414B may also manage the guest operating systems 406A-406C to ensure they don't conflict with one another or affect the operation of one another. The hypervisor 414B may also manage the scheduling of the virtual machines 404A-404C for running on the host device 402.

The hypervisor 414B can also manage the flow of information between software, the virtualized hardware, and the physical hardware. In one embodiment, the hypervisor 414B can determine that the I/O adapter device 410 is a SRIOV compliant device that can emulate the functionality of the one or more PV backend drivers using corresponding virtual functions. The hypervisor 414B can further configure the I/O adapter device 410 to provide the PCIe interface using one or more virtual functions for communication between the one or more PV frontend drivers (e.g., PV network frontend drivers 408A-408C, PV storage frontend drivers 408AA-408CC, etc.) and the corresponding one or more PV backend drivers (e.g. the PV network backend drivers 412A-412C, PV storage backend drivers 412AA-408CC, etc.). Thus, the PV backend drivers implemented by the I/O adapter device 410 can interface with the corresponding PV frontend drivers through a PCIe exposed memory space, without interfacing through an emulated interface for the I/O adapter device 410 in the hypervisor 414B.

Some embodiments of the disclosed technologies can allow the guest operating systems 406A-406C to have direct access to the PV backend drivers emulated by the I/O adapter device 410 by accessing the PCI/PCIe configuration space of the I/O adapter device 410 without going through the driver domain 414A and/or hypervisor 414B. Bypassing the hypervisor 414B can provide improved performance in terms of latency and bandwidth for transfer of data between the host device 402 and the I/O adapter device 410 since the hypervisor 414B may not be involved in the data path. Further, bypassing the hypervisor can free up the processor resources in the host device 402 that otherwise would be used for the hypervisor 414B. Processor cores can therefore use these resources to run other applications.

Figure 5:
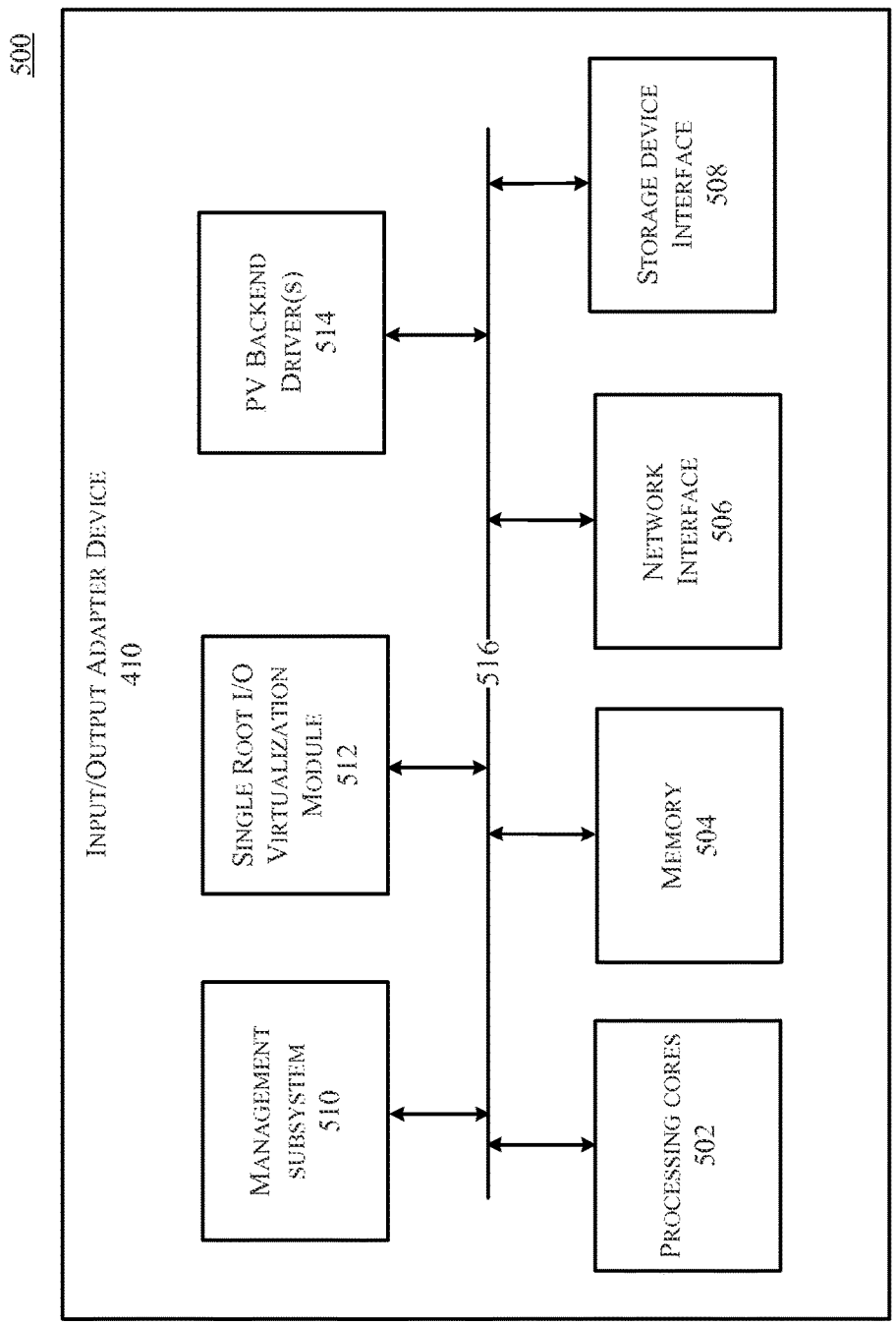
FIG. 5 illustrates components of an I/O adapter device, in accordance with one embodiment of the disclosed technology.

FIG. 5 illustrates components of an I/O adapter device, according to one embodiment of the disclosed technology. Note that FIG. 5 illustrates components of the I/O adapter device 410. However, in some embodiments, the I/O adapter device 308, as discussed with reference to FIG. 3, may be similar to the I/O adapter device 410 and may include some or all the components of the I/O adapter device 410.

The I/O adapter device 410 may include one or more processing cores 502, a memory 506, a network interface 506, a storage device interface 508, a management subsystem 510, a single root I/O virtualization module 512, and one or more PV backend drivers 514. Different components of the I/O adapter device 410 may be configured to communicate with one another using an interconnect 516. For example, the interconnect 516 may include busses, mesh, matrix, fabric or any suitable implementation to allow various components of the I/O adapter device 410 to communicate with one another. It will be understood that the I/O adapter device 410 may include more or less components than shown in FIG. 5. For example, in some implementations, the I/O adapter device 410 may also include one or more memory controllers, I/O controllers, etc. Although, embodiments of the disclosed technologies are described and shown as including certain components, aspects of the disclosed technologies are not limited to including specific components as shown in FIGS. 3-5. For example, in some implementations, the I/O adapter device 410 may not include processing cores 502 and/or memory 504 without deviating from the scope of the disclosed technologies.

The processing cores 502 may be configured to execute a plurality of instructions on one or more processors of the processing cores 502. Some non-limiting examples of the processing cores 502 may include ARM's cortex A57, MIPS, AMD Phenom, Intel ATOM, etc. The instructions may be stored on a computer-readable storage medium, for example, in the form of a computer program. The computer-readable storage medium may be non-transitory. In some instances, the computer readable medium may be part of the memory 504. The memory 504 may be internal or external to the I/O adapter device 410. For example, the memory 504 may be a RAM, ROM, Electrically Erasable Programmable Read-Only Memory (EEPROM), flash memory or any suitable storage media. In some embodiments, the processing cores 502 may share certain resources, such as busses and Level 1 (L1) caches and/or Level 2 (L2) caches between each of the processing cores.

The network interface 506 may include any suitable interface to enable the I/O adapter device 410 to communicate with the one or more remote devices 110 via the networks 112. For example, the I/O adapter device 410 may communicate with the one or more remote devices 110 for storage, archive, data processing, analysis, web services, etc., via the networks 112. In some embodiments, the networks 112 may include one or more networks that may be based on different protocols such as the Internet Protocol (IP), Ethernet, Wi-Fi, Transmission Control Protocol (TCP), User Datagram Protocol (UDP), Asynchronous Transfer Mode (ATM), token ring, frame relay, High Level Data Link Control (HDLC), Fiber Distributed Data Interface (FDDI), Point-to-Point Protocol (PPP), etc. For example, in one instance, the network interface 506 may include a physical Ethernet port.

The storage device interface 508 may include an interface for communicating with the one or more storage devices 314. The storage device interface 508 may be based on any suitable interface, e.g., SATA interface, PCI/PCIe interface, Serial Attached SCSI (SAS), etc. For example, in some embodiments, the I/O adapter device 410 may utilize the storage device interface 508 to store data in one or more local storage devices, e.g., SSDs, compact discs, USB portable drives, SATA drives, etc., that may be coupled to the I/O adapter device 410.

In one embodiment, the management subsystem 510 may be configured to manage different components of the I/O adapter device 410. In some embodiments, the management subsystem 510 may configure one or more configuration registers to show certain capabilities of the I/O adapter device 410. For example, the one or more configuration registers may include a plurality of bits to represent a vendor identifier, virtIO compatibility, SR-IOV compatibility, etc. In some embodiments, the one or more configuration registers may include PCIe configuration space registers that may be mapped in a memory and/or I/O port space of the host device 302. In one embodiment, the one or more configuration registers may be programmed by the BIOS software or configured by an external entity.

In one embodiment, the management subsystem 510 may implement PCI/PCIe configuration space for the I/O adapter device 410 to present the I/O adapter device 410 to the host device 302 as a PCIe endpoint on the PCI bus. The PCI/PCIe configuration space may include a standard set of registers that can be accessed by the host device 302 using the host interface. For example, the standard set of registers may be PCIe configuration space registers that may be mapped to a memory space of the host device 302. The host device 302 can determine the identity and/or capabilities of each of the PCIe endpoints by accessing one or more PCIe configuration space registers. For example, in some embodiments, the host device 302 may include a PCIe root complex that may be configured to communicate with the PCIe endpoints via the PCI/PCIe interface. In one embodiment, the host device 302 may perform bus enumeration to identify each endpoint device accessible via the PCI interface. The management subsystem 510 may configure one or more PCIe configuration space registers to include a specific virtIO device identifier (ID) and a vendor identifier (ID). The host device 302 may identify the I/O adapter device 410 as a virtIO device by accessing the virtIO device identifier and the vendor identifier via the PCIe interface and can load the appropriate frontend driver to communicate with the corresponding backend driver implemented in the I/O adapter device 410. It will be understood that for other PV standards, e.g., XEN blkdev, XEN scsidev, XEN netdev, etc., the PCIe configuration space registers may include appropriate device and vendor identifiers. In one implementation, the management subsystem 510 may work with the hypervisor 414B to implement the PCI configuration and memory space for exposing the PV backend drivers implemented by the I/O adapter device 410 to the host device 402. In one implementation, one or more bits of the configuration registers can be configured by the hypervisor 414B for providing the PCIe interface using one or more virtual functions for communication between the one or more PV storage backend drivers 412A-412C and the corresponding one or more PV storage frontend drivers 408A-408C, and between the one or more PV network backend drivers 412AA-412CC and the corresponding one or more PV network frontend drivers 408AA-408CC.

In some implementations, the SR-IOV module 512 may include logic to support the SR-IOV implementation by the I/O adapter device 410. For example, the SR-IOV implementation can allow the I/O adapter device 410 to present itself as multiple, independent virtual devices implementing one or more PV backend drivers. For example, the SR-IOV capability can allow the I/O adapter device 410 to implement multiple virtual functions, wherein each virtual function can emulate the functionality of a PV backend driver or be interface compatible with a PV backend driver. In some embodiments, the one or more virtual devices implementing respective PV network backend drivers 412A-412C and the PV storage backend drivers 412AA-412CC can be addressed as PCI/PCIe devices by mapping each of the virtual device in an I/O port address space or memory mapped address space of the host device 402. For example, the I/O adapter device 410 may be mapped as a PCI/PCIe device by implementing a PCI/PCIe configuration and memory mapped space. The PCI/PCIe configuration and memory mapped space can include a set of PCIe configuration space registers that may be mapped to memory locations. In one implementation, the SR-IOV module 512 may provide a logical communication channel between each PV backend driver and the corresponding PV frontend driver based on a corresponding virtual function implemented by the PCI/PCIe configuration and memory mapped space. This can allow the one or more guest operating systems to have direct access to the one or more PV backend drivers implemented by the I/O adapter device 410 by accessing the PCI/PCIe configuration and memory mapped space of the I/O adapter device 410 and without interfacing with the driver domain 414A or the hypervisor 414B.

In one implementation, the SR-IOV module 512 may be configured to interface with the host device 402. For example, in one implementation, the SR-IOV module 512 may include one or more PCI/PCIe controllers to communicate with one or more PCI/PCIe controllers (not shown) on the host device 402. In one implementation, the SR-IOV module 512 may include decoding logic for decoding the PCI/PCIe space to determine the appropriate PCI/PCIe configuration and memory mapped registers for exposing the respective emulated PV backend driver to the corresponding PC frontend driver on the host device 402. The SR-IOV module 512 may further communicate with the PV backend drivers 412A-412C and 412AA-412CC to enable the communication with the corresponding PV frontend drivers 408A-408C and 408AA-408CC.

In some embodiments, the PV backend drivers 514 may represent functionality of the one or more backend drivers implemented by the I/O adapter device 410. For example, in one embodiment, the I/O adapter device 410 may emulate the functionality of a backend driver for communicating with a corresponding frontend driver running on a host device using an emulated backend driver interface. The emulated backend driver interface may be interface compatible with a backend driver independent of the implementation of the PV backend drivers 514. For example, the emulated backend driver interface may be interface compatible with the PV backend drivers 212A-212C as discussed with reference to FIG. 2, however, implementation of the PV backend drivers 514 may not be same as the PV backend drivers 212A-212C. The PV backend drivers 514 may include a plurality of PV backend drivers, e.g., the network backend drivers and the storage backend drivers. In one implementation, the PV backend drivers 514 may include the first PV storage backend driver 412A, second PV storage backend driver 412B, third PV storage backend driver 412C, first PV network backend driver 412AA, second PV network backend driver 412BB and the third PV network backend driver 412CC, as discussed with reference to FIG. 4. In some embodiments, the PV backend drivers 514 may include a standard interface to comply with virtIO for communicating with the corresponding standard PV frontend drivers 408A-408C and 408AA-408CC based on the PCI interface. The PV backend drivers 514 may be implemented in hardware, software or a combination thereof.

According to some embodiments of the disclosed technologies, implementation of backend drivers by the I/O adapter device 410 can minimize the need of a device driver implementation in a driver domain, e.g., the device driver 216, as discussed with reference to FIG. 2. In some embodiments, functionalities specific to respective virtual device can be implemented by the I/O adapter device 410. For example, the I/O adapter device 410 can utilize SR-IOV implementation to appear as multiple virtual devices using multiple virtual functions implementing device specific functionalities and respective PV backend drivers 514. For example, the multiple virtual devices can be presented as NICs, block storage devices, audio cards, video cards, etc. to support specific vendors or device types. It will be understood that in some embodiments the I/O adapter device 410 can implement of the functionality of a backend driver in a non-virtualized environment to communicate with a frontend driver running on a host device.

Figure 6:
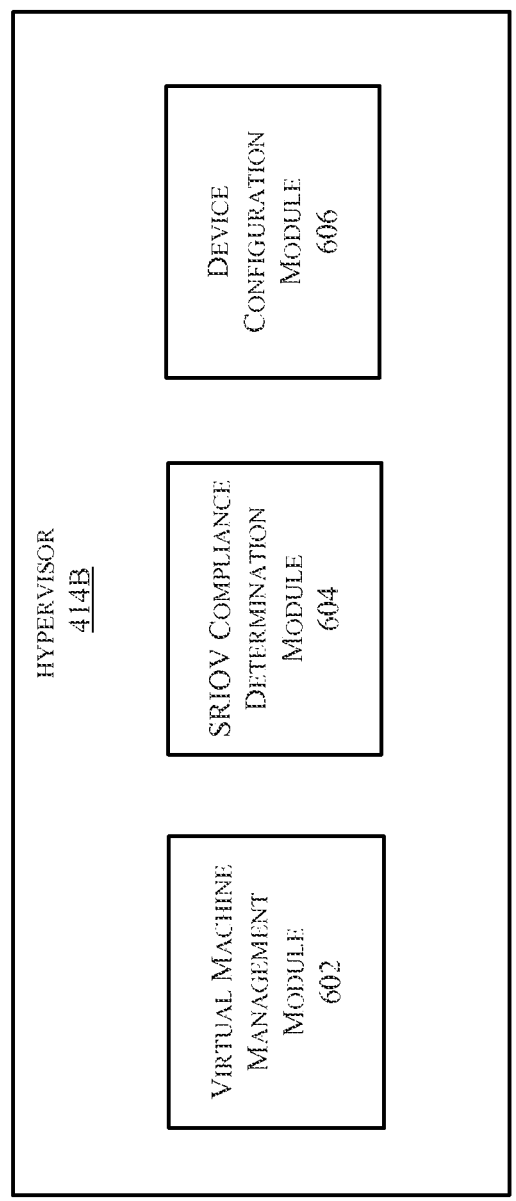
FIG. 6 illustrates components of a hypervisor, in accordance with one embodiment of the disclosed technology.
Figure 7:
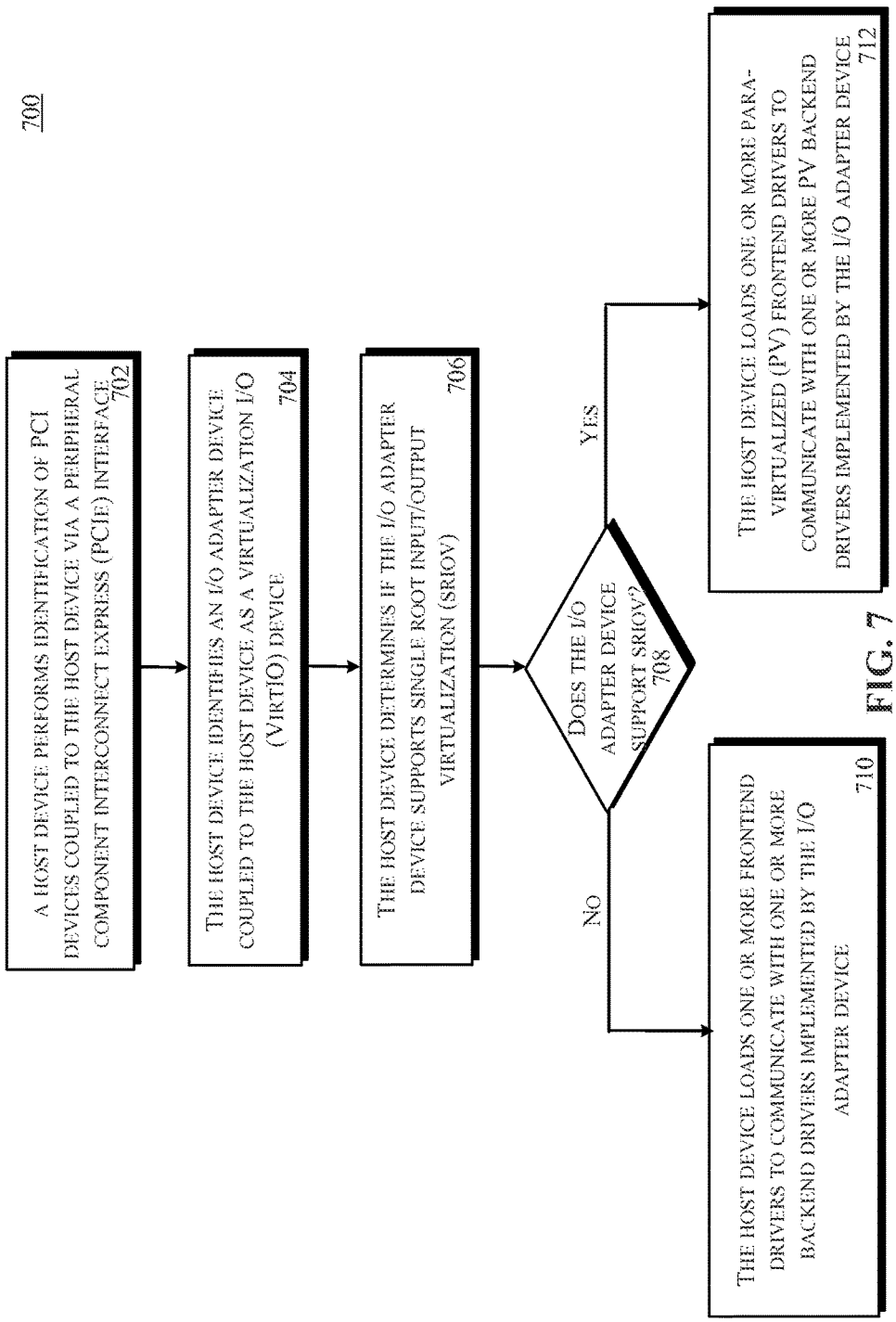
FIG. 7 illustrates an exemplary method performed by a host device to enable communication with PV backend drivers implemented by an I/O adapter device with the PV frontend drivers running on a host device, in one embodiment of the disclosed technology.
Figure 8:
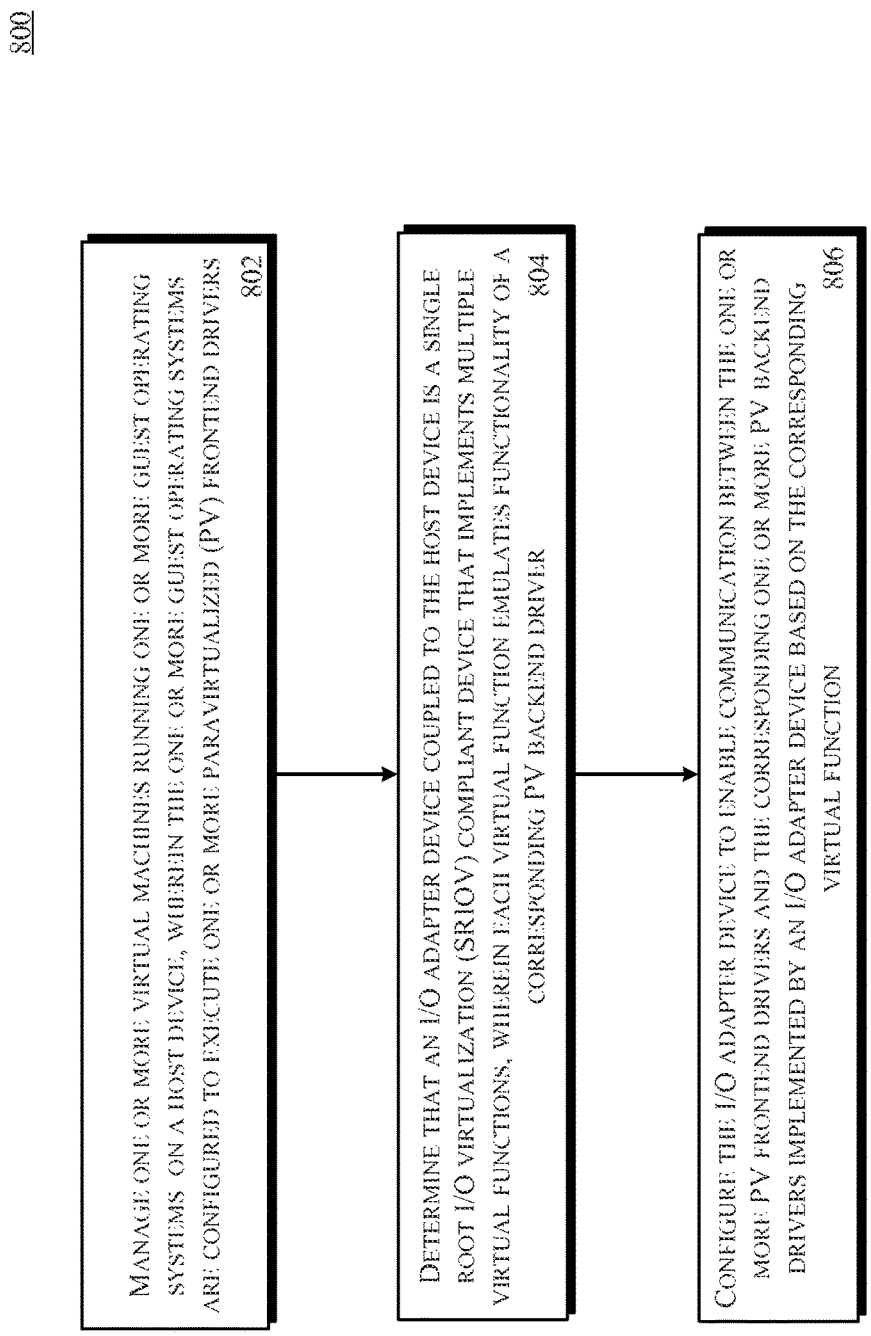
FIG. 8 illustrates an exemplary method performed by a hypervisor on a host device, in one embodiment of the disclosed technology.

The hypervisor 414B may include a virtual machine management module 602, an SR-IOV compliance determination module 604 and a device configuration module 606. It will be understood that the hypervisor 414B may include more or less components than shown in FIG. 6. The hypervisor 414B may be implemented as a piece of compute software, firmware or hardware. In some embodiments, the hypervisor 414B may include the functionality of the driver domain 414A.

The virtual machine management module 602 may be configured to manage the one or more virtual machines, e.g., to create, start, monitor, stop or to delete the virtual machines 404A-404C. The virtual machine management module 602 can manage the resources (processors, memory, etc.) of the physical computing environment of the host device 402 by dividing among several smaller independent virtual machines. Each virtual machine can run its own operating system called guest operating system, to which it appears the virtual machine has its own processor and memory, i.e. it appears as if it has its own physical machine. The virtual machine management module 602 may be configured to manage access controls, resources, scheduling, etc. for the virtual machines 404A-404C executing the guest operating systems 406A-406C on the host device 402. The virtual machine management module 602 may manage access controls for each virtual machine for performing certain restricted functions since in some instances the virtual machines 404A-404C running in the respective guest operating systems 406A-406C may have lower access privileges. The virtual machine management module 602 may also manage the guest operating systems 406A-406C to ensure they don't affect the operation of one another or the host device 402.

The SR-IOV compliance determination module 604 may be configured to determine that the I/O adapter device 410 is an SRIOV compliant device that implements the one or more PV network backend drivers 412A-412C and the one or more PV storage backend drivers 412AA-412CC using corresponding virtual functions. In one implementation, the SR-IOV compliance determination module 604 may read one or more bits of the configuration register (e.g., PCIe configuration space register) in the I/O adapter device 410 to determine the capability of the I/O adapter device 410 to be SRIOV compliant.

The device configuration module 606 may be configured to configure the I/O adapter device 410 to provide the PCIe interface using one or more virtual functions for communication between the one or more PV storage frontend drivers 408A-408C and the corresponding one or more PV storage backend drivers 412A-412C, and between the one or more PV network frontend drivers 408AA-408CC and the corresponding one or more PV network backend drivers 412AA-412CC. In one implementation, the device configuration module 606 may work with the SRIOV module 512, as discussed with reference to FIG. 5, for exposing the PV storage backend drivers 412A-412C and the PV network backend drivers 412AA-412CC implemented by the I/O adapter device 410 to the host device 402 by implementing the appropriate interface for the PV storage backend drivers 412A-412C and the PV network backend drivers 412AA-412CC in the PCI/PCIe configuration and memory space of the host device 402.

A method 700 illustrates communication between the backend driver implemented by the I/O adapter device and the frontend driver executing on the host device, as discussed with reference to FIGS. 3A, 3B and 4.

In step 702, a host device performs identification of PCI devices coupled to the host device via a PCIe interface. Referring back to FIGS. 3A-3B, the host device 302 may perform identification of PCIe devices (e.g., the I/O adapter device 308) coupled to the host device 302 via the PCIe interface (e.g., the host interface 312). In one embodiment, the host device 302 may perform bus enumeration to identify the PCIe endpoints on the PCIe bus. The I/O adapter device 308 may include PCIe configuration space registers that may be mapped to a PCIe configuration space of the host device 302. A PCIe root complex or a PCIe controller in the host device 302 can access the PCIe configuration space registers in the I/O adapter device 308 to identify the I/O adapter device 308, e.g., by reading a vendor ID, a device ID and any other suitable fields.

In step 704, the host device identifies an I/O adapter device coupled to the host device as a virtIO device. For example, the device ID for the I/O adapter device 308 may include a specific virtIO device ID. The host device 302 may identify the I/O adapter device 308 as a virtIO device based on the specific verIO device ID that can allow the use of standard frontend drivers executing from the host device 302. It will be understood that the I/O adapter device 308 may include the appropriate device ID for other PV standard drivers specific to network, storage, etc.

In step 706, the host device determines if the I/O adapter device supports SRIOV. For example, the host device 302 may determine if the I/O adapter device 308 is SRIOV compliant by reading a PCIe configuration space register. Referring back to FIG. 4, in some embodiments, the hypervisor 414B in the host device 402 may determine a capability of the I/O adapter device 410 to be SRIOV compliant. For example, as discussed with reference to FIG. 6, in one implementation, the SR-IOV compliance determination module 604 may determine that the I/O adapter device 410 is an SRIOV compliant device that implements the functionality of one or more PV network backend drivers 412A-412C and the one or more PV storage backend drivers 412AA-412CC using corresponding virtual functions based on one or more bits of the PCIe configuration space register accessible via the PCIe interface.

In step 708, the host device can determine if the I/O adapter device supports SRIOV. Based on the determination whether the I/O adapter device supports SRIOV or not the host device loads the appropriate frontend drivers to communicate with the corresponding backend drivers implemented by the I/O adapter device. For example, as discussed with reference to FIGS. 3A, 3B and 4, embodiments of the disclosed technologies can be applied to both non-virtualized environment and the virtualized environment.

In step 710, if the I/O adapter device doesn't support SRIOV, the host device loads one or more frontend drivers to communicate with one or more backend drivers implemented by the I/O adapter device through the host interface using one or more communication channels between the one or more backend drivers and the one or more frontend drivers. As discussed with reference to FIG. 3A, the host device 302 can load one or more frontend drivers 306 to communicate with the corresponding one or more backend drivers 310 via the host interface 312 using PCI/PCIe space. According to some embodiments, the I/O adapter device 308 can be virtIO compliant that can allow the use of standard frontend drivers 306 executing from the operating system 304. For example, the I/O adapter device 308 can present itself as a backend driver using an emulated backend driver interface to communicate with the frontend driver 306 in a non-virtualized environment. As shown in FIG. 3B, the host device 302 can load the storage frontend driver 306A to communicate with the storage backend driver 310A via the host interface 312A for accesses to the storage devices 314. Similarly, the host device 302 can load the network frontend driver 306B to communicate with the network backend driver 310B via the host interface 312B for accesses to the remote devices 110 via the networks 112.

In step 712, if the I/O adapter device supports SRIOV, the host device loads one or more PV frontend drivers to communicate with one or more PV backend drivers implemented by the I/O adapter device through the host interface using one or more communication channels between the one or more PV backend drivers and the one or more PV frontend drivers. According to some embodiments, the SRIOV capability can allow the I/O adapter device 410 to present itself as multiple virtual devices implementing multiple virtual functions to emulate corresponding multiple PV backend drivers. As discussed with reference to FIG. 4, the host device 402 can load one or more PV frontend drivers to communicate with the corresponding one or more PV backend drivers via the virtual PCIe interface. For example, the host device 402 can load the first PV storage frontend driver 408A executing from the first guest operating system 406A running in the first virtual machine 404A to communicate with the first PV storage backend driver 412A via the virtual bus interface 416A for accesses to the storage devices 314 via the storage device interface 316. Similarly, the host device 402 can load the first PV network frontend driver 408AA executing from the first guest operating system 406A running in the first virtual machine 404A to communicate with the first PV network backend driver 412AA via the virtual bus interface 416AA for accesses to the remote devices 110 via the networks 112. The host device 402 can also load the second and third PV network and storage frontend drivers to communicate with the corresponding second and third PV network and storage backend drivers in the I/O adapter device 410 via their respective virtual bus interfaces as shown in FIG. 4. As discussed with reference to FIG. 5, in one implementation, the SR-IOV module 512 may provide a logical communication channel between each PV backend driver and the corresponding PV frontend driver based on a corresponding virtual function implemented by the PCI/PCIe configuration and memory mapped space. This can allow the one or more guest operating systems 406A-406C to have direct access to the one or more PV backend drivers by accessing the PCI/PCIe configuration and memory mapped space of the I/O adapter device 410 and without interfacing through an emulated interface for the I/O adapter device 410 in the hypervisor 414B or driver domain 414A. Further, the combination of virtIO and SRIOV functionality can allow the implementation of backend drivers in the I/O adapter device 410 independent of the version of the operating system running on the host device 402.

In step 802, a hypervisor manages one or more virtual machines running one or more guest operating systems on a host device. The one or more guest operating systems are configured to execute one or more PV frontend drivers. Referring back to FIG. 5, the hypervisor 414B can manage the virtual machines 404A-404C running the respective guest operating systems 406A-406C on the host device 402. The guest operating systems 406A-406C may be configured to execute the one or more PV storage frontend drivers 408A-408C and/or the one or more PV network frontend drivers 408AA-408CC. In some embodiments, the hypervisor 414B can manage access controls, resources, scheduling, isolation, etc. for the virtual machines 404A-404C running the guest operating systems 406A-406C.

In step 804, the hypervisor determines that an I/O adapter device coupled to the host device is an SR-IOV compliant device that implements multiple virtual functions, wherein each virtual function emulates functionality of a corresponding PV backend driver. Referring back to FIG. 5, in one implementation, the hypervisor 414B can read one or more bits in a configuration register in the I/O adapter device 410 to determine certain capabilities of the I/O adapter device 410 to be SR-IOV compliant. For example, the SR-IOV capability can allow the I/O adapter device 410 to present itself as multiple, independent virtual devices to the host device 402. In some embodiments, the multiple virtual devices can implement the one or more PV storage backend drivers 412A-412C to communicate with the one or more PV storage frontend drivers 408A-408C via the virtual bus interface 416A-416C, and the one or more PV network backend drivers 412AA-412CC to communicate with the one or more PV network frontend drivers 408AA-408CC via the virtual bus interface 416AA-416CC. According to some embodiments, the one or more PV backend drivers and the one or more PV frontend drivers can be virtIO compliant drivers that can communicate using a standardized interface independent of the operating system vendor.

In step 806, the hypervisor configures the I/O adapter device to enable communication between the one or more PV frontend drivers and the corresponding one or more PV backend drivers implemented by the I/O adapter device using one or more virtual functions based on a PCIe interface. Referring back to FIG. 5, in one implementation, the hypervisor 414B may configure the I/O adapter device 410 to enable the communication between the one or more PV storage backend drivers 412A-412C and the one or more PV storage frontend drivers 408A-408C by exposing the one or more PV storage backend drivers 412A-412C as a first set of virtual functions in the PCI/PCIe configuration and memory space of the host device 402. Similarly, the hypervisor 414B may configure the I/O adapter device 410 to enable the communication between the one or more PV network backend drivers 412AA-412CC and the one or more PV network frontend drivers 408AA-408CC by exposing the one or more PV network backend drivers 412AA-412CC as a second set of virtual functions in the PCI/PCIe configuration and memory space of the host device 402.

In accordance with various embodiments of the disclosed technologies, an I/O adapter device can implement the functionality of one or more backend drivers to communicate with one or more frontend drivers running on a host device using emulated backend driver interfaces and without interfacing with a driver domain or a hypervisor in the host device. The one or more backend drivers can communicate with the one or more frontend drivers via a PCI/PCIe interface. In some embodiments, complying with the SR-IOV and virtIO implementation can allow the one or more backend drivers and the one or more frontend drivers to communicate using a standardized interface irrespective of virtualization. This can allow the I/O adapter device to be not limited to communicating with specific operating system versions running on the host device and can also improve performance by bypassing the hypervisor in the data path thus allowing the processing cores to use the resources for other applications.

Figure 9:
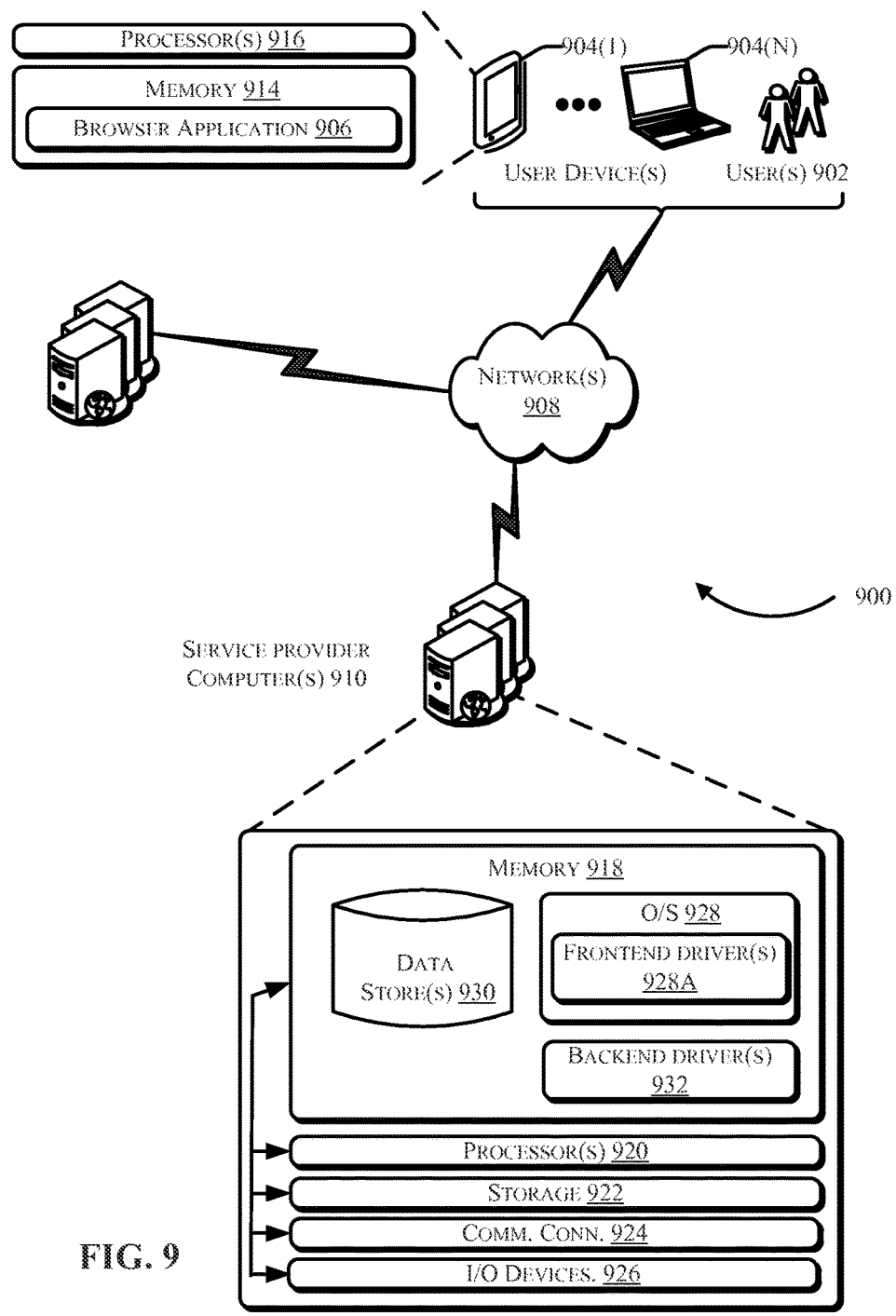
FIG. 9 illustrates an exemplary architecture for features and systems described herein that includes one or more service provider computers and/or a user device connected via one or more networks, according to at least one exemplary embodiment.

FIG. 9 illustrates an exemplary architecture for features and systems described herein that includes one or more service provider computers and/or a user device connected via one or more networks, according to at least one exemplary embodiment. The devices discussed in FIGS. 3-4, may use one or more components of the computing devices described in FIG. 9 or may represent one or more computing devices described in FIG. 9. In architecture 900, one or more users 902 may utilize user computing devices 904(1)-(N) (collectively, user devices 904) to access application 906 (e.g., a web browser or mobile device application), via one or more networks 908. In some aspects, application 906 may be hosted, managed and/or provided by a computing resources service or service provider. One or more service provider computers 910 may provide a native application which is configured to run on user devices 904 which user(s) 902 may interact with. Service provider computer(s) 910 may, in some examples, provide computing resources such as, but not limited to, client entities, low latency data storage, durable data storage, data access, management, virtualization, cloud-based software solutions, electronic content performance management, etc. Service provider computer(s) 910 may also be operable to provide web hosting, computer application development and/or implementation platforms, combinations of the foregoing or the like to user(s) 902. Service provider computer(s) 910, in some examples, may communicate with one or more third party computers 912.

In some examples, network(s) 908 may include any one or a combination of many different types of networks, such as cable networks, the Internet, wireless networks, cellular networks and other private and/or public networks. While the illustrated example represents user(s) 902 accessing application 906 over network(s) 908, the described techniques may equally apply in instances where user(s) 902 interact with service provider computer(s) 910 via user device(s) 904 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 906 may allow user(s) 902 to interact with service provider computer(s) 910 such as to access web content (e.g., web pages, music, video, etc.). Service provider computer(s) 910, perhaps arranged in a cluster of servers or as a server farm, may host application 906 and/or cloud-based software services. Other server architectures may also be used to host application 906. Application 906 may be capable of handling requests from many users 902 and serving, in response, various item web pages. Application 906 can provide any type of website that supports user interaction, including social networking sites, online retailers, informational sites, blog sites, search engine sites, news and entertainment sites and so forth. As discussed above, the described techniques can similarly be implemented outside of application 906, such as with other applications running on user device(s)1404.

User device(s) 904 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 904 may be in communication with service provider computer(s) 910 via network(s) 908, or via other network connections. Additionally, user device(s) 904 may be part of the distributed system managed by, controlled by or otherwise part of service provider computer(s) 910 (e.g., a console device integrated with service provider computers 910).

In one illustrative configuration, user device(s) 904 may include at least one memory 914 and one or more processing units (or processor(s)) 916. Processor(s) 916 may be implemented as appropriate in hardware, computer-executable instructions, firmware, or combinations thereof. Computer-executable instruction or firmware implementations of processor(s) 916 may include computer-executable or machine-executable instructions written in any suitable programming language to perform the various functions described. User device(s) 904 may also include geo-location devices (e.g., a global positioning system (GPS) device or the like) for providing and/or recording geographic location information associated with user device(s) 904.

Memory 914 may store program instructions that are loadable and executable on processor(s) 916, as well as data generated during the execution of these programs. Depending on the configuration and type of user device(s) 904, memory 914 may be volatile (such as random access memory (RAM)) and/or non-volatile (such as read-only memory (ROM), flash memory, etc.). User device(s) 904 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 914 may include multiple different types of memory, such as static random access memory (SRAM), dynamic random access memory (DRAM), or ROM.

Turning to the contents of memory 914 in more detail, memory 914 may include an operating system and one or more application programs or services for implementing the features disclosed herein including at least a user provided input element or electronic service web page, such as via browser application 906 or dedicated applications (e.g., smart phone applications, tablet applications, etc.). Browser application 906 may be configured to receive, store and/or display a website or other interface for interacting with service provider computer(s) 910. Additionally, memory 914 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 904.

In some aspects, service provider computer(s) 910 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 910 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 910 may be in communication with user device(s) 904 and/or other service providers via network(s) 908, or via other network connections. Service provider computer(s) 910 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 910 may include at least one memory 918 and one or more processing units (or processor(s)) 920. Processor(s) 920 may be implemented as appropriate in hardware, computer-executable instructions, firmware or combinations thereof. Computer-executable instruction or firmware implementations of processor(s) 920 may include computer-executable or machine-executable instructions written in any suitable programming language to perform the various functions described.

In some instances, hardware processor(s) 920 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 918 may store program instructions that are loadable and executable on processor(s) 920, as well as data generated during the execution of these programs. Depending on the configuration and type of service provider computer(s) 910, memory 918 may be volatile (such as RAM) and/or non-volatile (such as ROM, flash memory, etc.). Service provider computer(s) 910 or servers may also include additional storage 922, which may include removable storage and/or non-removable storage. The additional storage 922 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 918 may include multiple different types of memory, such as SRAM, DRAM, or ROM.

Memory 918, the additional storage 922, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 918 and the additional storage 922 are all examples of computer storage media. Additional types of computer storage media that may be present in service provider computer(s) 910 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 910. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 910 may also contain communications connection(s) 924 that allow service provider computer(s) 910 to communicate with a stored database, another computing device or server, user terminals and/or other devices on network(s) 908. Service provider computer(s) 910 may also include I/O device(s) 926, such as a keyboard, a mouse, a pen, a voice input device, a touch input device, a display, speakers, a printer and the like.

Memory 918 may include an operating system 928, one or more data stores 930 and/or one or more application programs or services for implementing the features disclosed herein. The operating system 928 may include one or more frontend drivers 928A. The one or more frontend drivers 928A may be similar to the one or more frontend drivers 306 as described with reference to FIGS. 3A-3B. For example, the frontend drivers may include the storage frontend driver 306A and the network frontend driver 306B. In some implementations, the memory 918 may include one or more backend drivers 932. The one or more backend drivers 932 may be similar to the one or more backend drivers 310 as described with reference to FIGS. 3A-3B. For example, the backend drivers may include the storage backend driver 310A and the network backend driver 310B. According to some embodiments, the one or more backend drivers 932 may be implemented by an I/O adapter device with an emulated backend driver interface compatible with a backend driver typically implemented in a hypervisor or a driver domain, e.g., the I/O adapter device 308 or the I/O adapter device 410. Embodiments of the disclosed technologies can provide improved latency and bandwidth since the hypervisor or the driver domain is not included in the data path. Bypassing the hypervisor/driver domain can free up the CPU resources (e.g., processor 920) that otherwise would be used for the hypervisor/driver domain. Processor cores can therefore use these resources to run the guest applications for the customers, e.g., the users 902. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, and/or functions described herein can be provided by one or more modules that exist as separate modules and/or module functions described herein can be spread over multiple modules.

Figure 10:
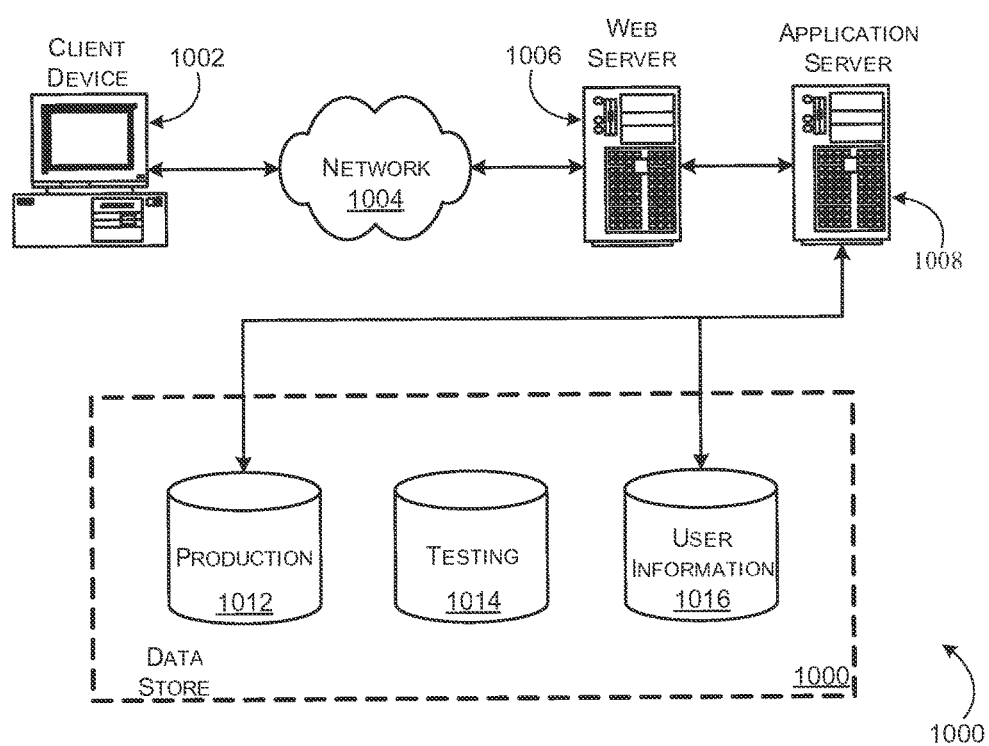
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those various embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An Input/Output (I/O) adapter device comprising:
    a storage device interface configured to communicate with a first storage device and a second storage device communicatively coupled to the I/O adapter device;
    a host interface configured to communicate with a host device communicatively coupled to the I/O adapter device, wherein the host device is configured to run an operating system and wherein the operating system executes a standardized storage frontend driver to communicate with the I/O adapter device through the host interface and using a standardized interface implemented in the operating system; and
    a processing core communicatively coupled to the storage device interface and to the host interface, wherein the processing core is configured to execute a plurality of computer-executable instructions to execute:
    a first emulated storage backend driver to communicate with the standardized storage frontend driver through the host interface using the standardized interface, and to communicate with the first storage device, to provide the standardized storage frontend driver with access to the first storage device; and
    a second emulated storage backend driver to communicate with the standardized storage frontend driver through the host interface using the standardized interface, and to communicate with the second storage device, to provide the standardized storage frontend driver with access to the second storage device.

2. The I/O adapter device of claim 1, wherein the host interface comprises a Peripheral Component Interconnect Express (PCIe) interface and the I/O adapter device communicates with the standardized storage frontend driver using a PCIe exposed memory space.

3. The I/O adapter device of claim 1, wherein the operating system is a guest operating system executing from a virtual machine running on the host device; and wherein the standardized interface comprises a VirtIO compliant interface.

4. The I/O adapter device of claim 3, wherein the I/O adapter device is a single root input/output virtualization (SRIOV) compliant device implementing multiple virtual functions wherein each SRIOV virtual function is emulating functionality of a corresponding para-virtualized (PV) backend driver, and wherein the storage frontend driver is a PV frontend driver.

5. An Input/Output (I/O) adapter device comprising:
    a storage device interface configured to communicate with a first storage device and a second storage device communicatively coupled to the I/O adapter device;

a host interface configured to communicate with a host device communicatively coupled to the I/O adapter device, wherein the host device is configured to execute software codes including a standardized storage frontend driver to communicate with the I/O adapter device through the host interface and using a standardized interface as part of the software codes;

a first emulated storage backend driver configured to communicate with the standardized storage frontend driver through the host interface using the standardized interface and to communicate with the first storage device to provide the standardized storage frontend driver with access to the first storage device; and a second emulated storage backend driver configured to communicate with the standardized storage frontend driver through the host interface using the standardized interface and to communicate with the second storage device to provide the standardized storage frontend driver with access to the second storage device.

6. The I/O adapter device of claim 5, wherein the host interface comprises a Peripheral Component Interconnect Express (PCIe) interface.

7. The I/O adapter device of claim 6, wherein the standardized storage frontend driver is executing from an operating system running on the host device in a non-virtualized environment and wherein the I/O adapter device is emulating functionality of a storage backend driver configured to communicate with the standardized storage frontend driver through the PCIe interface.

8. The I/O adapter device of claim 5, wherein the standardized storage frontend driver is executing from a guest operating system running in a virtual machine on the host device and wherein the standardized storage frontend driver is a para-virtualized (PV) frontend driver and the I/O adapter device is emulating functionality of a PV backend driver.

9. The I/O adapter device of claim 8, wherein the I/O adapter device is a single root input/output virtualization (SRIOV) compliant device implementing multiple virtual functions and wherein each virtual function is emulating functionality of a corresponding PV backend driver.

10. The I/O adapter device of claim 5, wherein the standardized interface comprises a VirtIO compliant interface.

11. The I/O adapter device of claim 9, wherein the standardized interface comprises a VirtIO compliant interface and wherein each virtual function emulating functionality of the corresponding PV backend driver is VirtIO compliant.

12. The I/O adapter device of claim 9, wherein the standardized storage frontend driver is a "blkdev" compliant driver and wherein each virtual function emulating functionality of the corresponding PV backend driver is "blkdev" compliant.

13. The I/O adapter device of claim 9, wherein the standardized storage frontend driver is a "scsidev" compliant driver and wherein each virtual function emulating functionality of the corresponding PV backend driver is "scsidev" compliant.

14. The I/O adapter device of claim 5, wherein a storage backend driver emulated by the I/O adapter device interfaces with the standardized storage frontend driver through a Peripheral Component Interconnect Express (PCIe) exposed memory space, without interfacing through an emulated interface for the I/O adapter device in a driver domain on the host device.

15. The I/O adapter device of claim 5, the I/O adapter device further comprising:

a network interface configured to communicate with a plurality of remote devices via one or more networks; and an emulated network backend driver, wherein the emulated network backend driver of the I/O adapter device is further configured to communicate with a network frontend driver executing on the host device through the host interface using the standardized interface.

16. The I/O adapter device of claim 15 wherein the host interface comprises a PCIe interface and wherein the I/O adapter device is emulating functionality of a network backend driver configured to communicate with the network frontend driver through the PCIe interface.

17. A system comprising:

a host device configured to run one or more operating systems, wherein each of the one or more operating systems executes a plurality of standardized frontend drivers including a standardized storage frontend driver and a standardized network frontend driver, each of the plurality of standardized frontend drivers comprising a standardized interface; and an Input/Output (I/O) adapter device communicatively coupled to the host device using a host interface, the I/O adapter device comprising:

a network interface configured to communicate with a plurality of remote devices via one or more networks;

a storage device interface configured to communicate with a first storage device and a second storage device communicatively coupled to the I/O adapter device; and a plurality of emulated backend drivers including a first emulated storage backend driver, a second emulated storage backend driver, and an emulated network backend driver, wherein:

the first emulated storage backend driver is configured to communicate with the standardized storage frontend driver through the host interface using the standardized interface and to communicate with the first storage device to provide the standardized storage frontend driver with access to the first storage device;

the second emulated storage backend driver is configured to communicate with the standardized storage frontend driver through the host interface using the standardized interface and to communicate with the second storage device to provide the standardized storage frontend driver with access to the second storage device and the emulated network backend driver is configured to communicate with the standardized network frontend driver through the host interface using the standardized interface and to communicate with the plurality of remote devices to provide the standardized storage frontend driver with access to the plurality of remote devices.

18. The system of claim 17, wherein the standardized interface comprises a VirtIO compliant interface.

19. The system of claim 17, wherein each of the plurality of emulated backend drivers of the I/O adapter device interfaces with the corresponding standardized frontend driver from the plurality of standardized frontend drivers through a Peripheral Component Interconnect Express (PCIe) interface, without emulating aspects of the I/O adapter device in a driver domain on the host device.

20. The system of claim 17, wherein the I/O adapter device is a single root input/output virtualization (SRIOV)

compliant device implementing multiple virtual functions, wherein each SRIOV virtual function is emulating functionality of a corresponding PV backend driver for each guest operating system, and wherein the plurality of frontend drivers are executing from one or more guest operating systems running on the host device and wherein each of the plurality of frontend drivers is a PV frontend driver.

21. The I/O adapter device of claim 1, wherein the first storage device and the second storage device are of a first type of device;
   wherein the I/O adapter device comprises a second device interface configured to communication with a third device communicatively coupled to the I/O adapter device, the third device being of a second type of device; and
   wherein the operating system executes a second standardized frontend driver to communicate, through the host interface and using the standardized interface, with the I/O adapter device;
   wherein the processing core is configured to execute a plurality of computer-executable instructions to execute a third emulated backend driver to communicate with the second standardized frontend driver through the host interface using the standardized interface, and to communicate with the third device to provide the standardized storage frontend driver with access to the third device.

* * * * *